United States Patent
Onodera et al.

(10) Patent No.: US 9,859,961 B2
(45) Date of Patent: Jan. 2, 2018

(54) METHOD FOR SPATIALLY MULTIPLEXING A PLURALITY OF DATA DESIGNATED FOR A PLURALITY OF USER TERMINALS USING MU-MIMO

(71) Applicant: Sharp Kabushiki Kaisha, Osaka-shi, Osaka (JP)

(72) Inventors: Takashi Onodera, Osaka (JP); Hiromichi Tomeba, Osaka (JP); Minoru Kubota, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/783,214

(22) PCT Filed: Mar. 24, 2014

(86) PCT No.: PCT/JP2014/058117
§ 371 (c)(1),
(2) Date: Oct. 8, 2015

(87) PCT Pub. No.: WO2014/167992
PCT Pub. Date: Oct. 16, 2014

(65) Prior Publication Data
US 2016/0049997 A1 Feb. 18, 2016

(30) Foreign Application Priority Data
Apr. 10, 2013 (JP) .................................. 2013-082096

(51) Int. Cl.
*H04W 4/00* (2009.01)
*H04B 7/0456* (2017.01)
(Continued)

(52) U.S. Cl.
CPC ............. *H04B 7/0456* (2013.01); *H04B 7/04* (2013.01); *H04B 7/0452* (2013.01);
(Continued)

(58) Field of Classification Search
CPC ...... H04B 7/0456; H04B 7/04; H04B 7/0452; H04W 16/28; H04W 76/02; H04W 76/04
See application file for complete search history.

(56) References Cited

U.S. PATENT DOCUMENTS

| 7,848,279 B2 | 12/2010 | Ranta-aho et al. |
| 2007/0183380 A1* | 8/2007 | Rensburg ............. H04B 7/0452 370/338 |

(Continued)

FOREIGN PATENT DOCUMENTS

| JP | 2013-42350 A | 2/2013 |
| WO | 2012/053154 A1 | 4/2012 |

OTHER PUBLICATIONS

Official Communication issued in International Patent Application No. PCT/JP2014/058117, dated Apr. 22, 2014.
(Continued)

*Primary Examiner* — Abdelnabi O Musa
(74) *Attorney, Agent, or Firm* — Keating & Bennett, LLP

(57) ABSTRACT

A terminal apparatus can be notified whether an MU-MIMO signal transmitted from a base station apparatus is linear-precoded or nonlinear-precoded by using effective signaling. According to the present invention, the base station apparatus decides whether the nonlinear precoding is used in an own cell, includes the decided nonlinear precoding setting information in system information or a layer 3 message, and notifies the terminal apparatus of the decided nonlinear precoding setting information by using a physical broadcast channel, a physical downlink share channel, or the like. The terminal apparatus performs a demodulation process for user data destined for the own terminal apparatus based on the nonlinear precoding setting information acquired from the notified system information or layer 3 message.

9 Claims, 9 Drawing Sheets

(51) Int. Cl.
H04B 7/04      (2017.01)
H04W 16/28     (2009.01)
H04B 7/0452    (2017.01)
H04W 76/02     (2009.01)
H04W 76/04     (2009.01)

(52) U.S. Cl.
CPC .......... *H04W 16/28* (2013.01); *H04W 76/02* (2013.01); *H04W 76/04* (2013.01)

(56) References Cited

U.S. PATENT DOCUMENTS

| | | | | |
|---|---|---|---|---|
| 2007/0189236 | A1* | 8/2007 | Ranta-aho | H04W 72/048 370/335 |
| 2010/0266056 | A1* | 10/2010 | Lee | H04B 7/0452 375/260 |
| 2011/0032839 | A1* | 2/2011 | Chen | H04B 7/024 370/252 |
| 2013/0183990 | A1 | 7/2013 | Tsutsui | |
| 2013/0242886 | A1* | 9/2013 | Chen | H04W 52/243 370/329 |
| 2014/0126509 | A1* | 5/2014 | You | H04B 7/04 370/329 |
| 2014/0204841 | A1 | 7/2014 | Ruiz Delgado et al. | |
| 2014/0254495 | A1* | 9/2014 | Farmanbar | H04W 72/12 370/329 |

OTHER PUBLICATIONS

Spencer et al., "An Introduction to the Multi-User MIMO Downlink", IEEE Communications Magazine, vol. 42, No. 10, pp. 60-67, Oct. 2004.

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.5.0, Jun. 2012, pp. 1-101.

Hochwald et al., "A Vector-Perturbation Technique for Near-Capacity Multiantenna Multiuser Communication—Part II: Perturbation", IEEE Transactions on Communications, vol. 53, No. 3, Mar. 2005, pp. 537-544.

Takeda et al., "Single-Carrier HARQ Using Joint THP and FDE", 2007 Vehicular Technology Conference, Sep. 30, 2007-Oct. 3, 2007, 5 pages.

"3rd Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331 V10.4.0, Dec. 2011, pp. 1-296.

\* cited by examiner

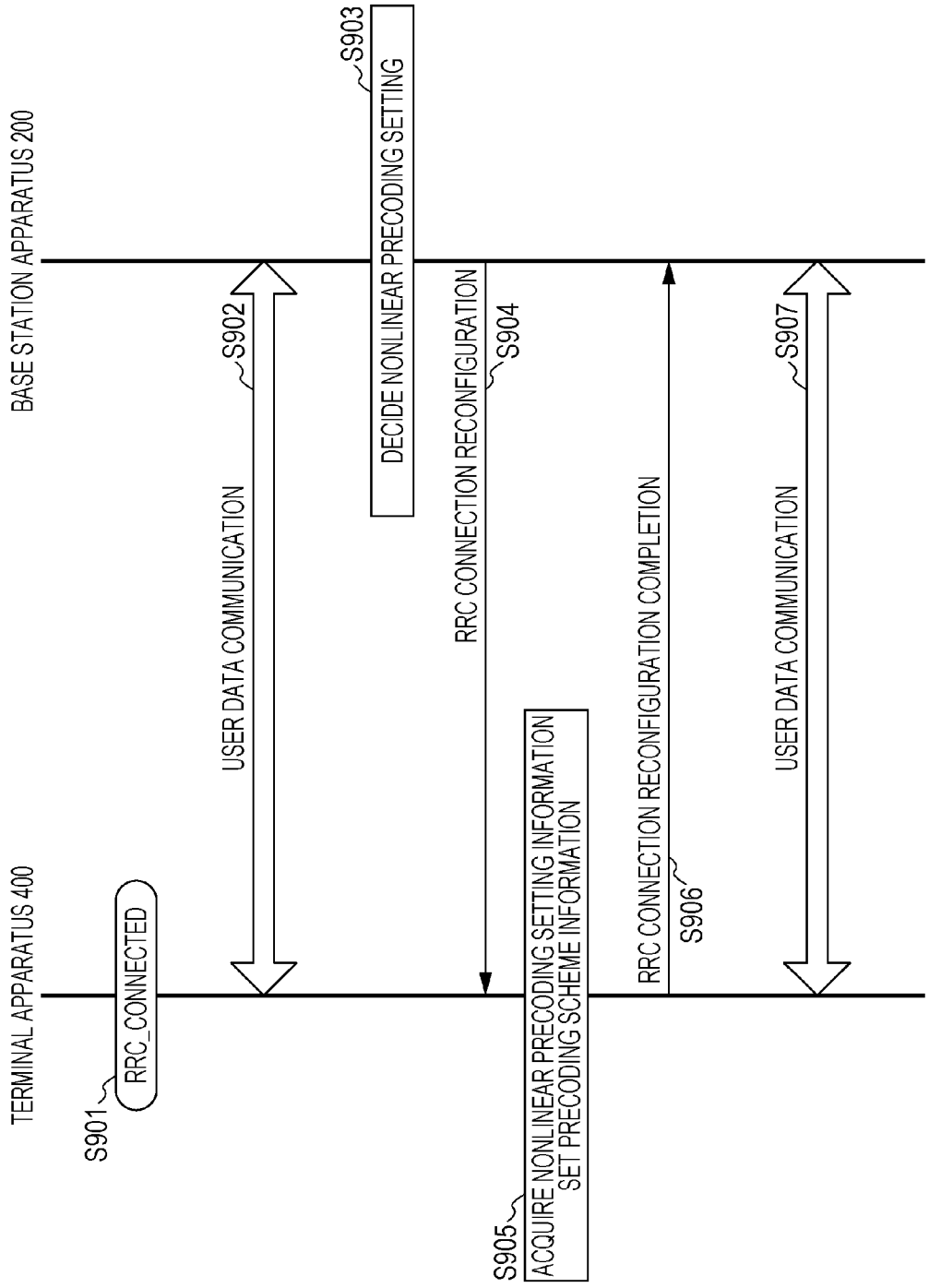

METHOD FOR SPATIALLY MULTIPLEXING A PLURALITY OF DATA DESIGNATED FOR A PLURALITY OF USER TERMINALS USING MU-MIMO

TECHNICAL FIELD

The present invention relates to a base station apparatus, a terminal apparatus, a wireless communication system, and an integrated circuit.

BACKGROUND ART

Multiple-Input Multiple-Output (MIMO) transmission technologies for spatially multiplexing a plurality of different data sequences (data streams) at the same frequency band and performing simultaneous communication using a plurality of antennas for transmission and reception have been put into practical use in wireless LANs or cellular systems. In Single User MIMO (SU-MIMO) of spatially multiplexing a plurality of different data sequences and transmitting the data sequences to one certain terminal apparatus (a reception apparatus or user equipment (UE)), there are methods of precoding transmission signals and transmitting the transmission signals in a base station apparatus (a transmission apparatus, an eNodeB, or an access point) are used to improve performance of separation and detection of the plurality of data sequences in a terminal apparatus.

In cellular systems of Long Term Evolution (LTE), LTE-Advanced (LTE-A), or the like standardized in Third Generation Partnership Project (3GPP) or wireless LAN systems of IEEE 802.11ac or the like standardized in the Institute of Electrical and Electronics Engineers, Inc (IEEE), systems in which the number of transmission antennas included in a base station apparatus (access point) is considerably greater than the number of reception antennas included in a terminal apparatus have been proposed. Further, in order to further improve system throughput by effectively utilizing a plurality of transmission antennas of a base station apparatus, Multi-User MIMO (MU-MIMO) for performing MIMO multiplexing on data sequences destined for a plurality of terminal apparatuses (users) has been proposed.

In MU-MIMO, since a transmission signal destined for another terminal apparatus is received as inter-user interference (IUI) in a terminal apparatus, it is necessary to suppress the IUI. Several methods have been proposed in which transmission signals capable of suppressing occurrence of IUI can be generated at the time of reception in terminal apparatuses without applying a large load to the terminal apparatuses when base station apparatuses know channel states from each transmission antenna of the base station apparatus to each reception antenna of each terminal apparatus (see NPL 1).

For example, in LTE-A, beamforming (linear precoding) is adopted in which each terminal apparatus selects one precoding matrix from among candidates (codebooks) of the precoding matrix based on a channel state and notifies a base station apparatus of the index (Precoding Matrix Indicator (PMI)), and the base station apparatus suppresses IUI by multiplying a transmission signal in advance by a linear filter (transmission weight) calculated based on the PMI in the base station apparatus (see NPL 2).

However, IUI cannot be efficiently suppressed unless orthogonality of a channel subjected to spatial multiplexing between terminal apparatuses is high. Therefore, there is a limit to an improvement in frequency use efficiency in MU-MIMO based on linear precoding (linear MU-MIMO).

Accordingly, in recent years, MU-MIMO (nonlinear MU-MIMO) technologies in which nonlinear precoding is performed on the side of a base station apparatus have been noticed. When modulo (surplus) calculation is possible, a terminal apparatus can add a perturbation vector, which has a complex number (perturbation term) obtained by multiplying any Gaussian integer by a real number as a component, to a transmission signal. Accordingly, by appropriately setting a perturbation vector according to channel states between a base station apparatus and a plurality of terminal apparatuses and generating transmission signals, necessary transmission power can be considerably reduced more than linear precoding in which no perturbation vector is added, for example, even when orthogonality of a channel subjected to spatial multiplexing between terminal apparatuses is not high. Thus, transmission efficiency can be considerably improved (see NPL 3).

CITATION LIST

Non Patent Literature

NPL 1: "An Introduction to the Multi-User MIMO Downlink", IEEE Communication Magazine, Vol. 42, Issue10, pp. 60 to 67 by Q. H. Spencer et al. October 2004

NPL 2: 3GPP, "E-UTRA; Physical Channels and Modulation (Release10)", TS36. 211 V10. 5.0, June 2012

NPL 3: "A vector-perturbation technique for near-capacity multiantenna multiuser communication-Part II:Perturbation", IEEE Trans. Commun., Vol. 53, No. 3, pp. 537 to 544, by B. M. Hochwald et al. March 2005

NPL 4: "Single-Carrier HARQ Using Joint THP and FDE", IEEE VTC-2007 Fall, pp. 1188 to 1192, by K. Takeda et al. September 2007

NPL 5: 3GPP, "E-UTRA; Radio Resource Control (RRC); Protocol specification (Release 10)", TS 36.331 V10. 4.0, December 2011

SUMMARY OF INVENTION

Technical Problem

Unlike linear precoding, a terminal apparatus receiving a signal for which interference is suppressed by nonlinear precoding and which is transmitted performs modulo calculation on the received signal and then performs a demodulation process. Alternatively, the terminal apparatus necessarily performs a demodulation process (see NPL 4 or the like) considering that a perturbation vector is added by nonlinear precoding and the signal is transmitted from a base station apparatus (hereinafter this process is referred to as a demodulation process considering modulo calculation in accordance with demodulation processes of both parties).

For this reason, when a base station apparatus also corresponds to MU-MIMO using nonlinear precoding in addition to linear precoding in a wireless communication system, it is necessary to appropriately switch whether the demodulation process considering modulo calculation is performed according to a used precoding scheme in a terminal apparatus.

The present invention is devised in view of such a circumstance and an object of the present invention is to provide a base station apparatus, a terminal apparatus, and a wireless communication system capable of notifying a terminal apparatus whether an MU-MIMO signal transmitted from a base station apparatus is linear precoding or nonlinear precoding by using efficient signaling.

Solution to Problem (1) To achieve the foregoing object, the present invention has finalized the following means. That is, according to the present invention, a base station apparatus spatially multiplexes data destined for a plurality of terminal apparatuses by using multiuser MIMO transmission and transmits the data. The base station apparatus includes nonlinear precoding setting information regarding whether to use nonlinear precoding in the multiuser MIMO transmission in a message of a radio resource control layer and notifies the terminal apparatuses of the nonlinear precoding setting information.

(2) According to the present invention, a terminal apparatus communicates with a base station apparatus including a plurality of antennas. Nonlinear precoding setting information which is included in a message of a radio resource control layer and notified by the base station apparatus and is information regarding whether to use nonlinear precoding is acquired. When the nonlinear precoding setting information indicates that nonlinear precoding is used, a received signal is blindly estimated to be a signal by linear precoding or a signal by the nonlinear precoding, one of a demodulation process considering no modulo calculation and a demodulation process considering modulo calculation is selected based on the estimation result, and the selected demodulation process is performed on the received signal.

(3) According to the present invention, a terminal apparatus communicates with a base station apparatus including a plurality of antennas. Nonlinear precoding setting information which is included in a message of a radio resource control layer and notified by the base station apparatus and is information regarding whether to use nonlinear precoding is acquired. When the nonlinear precoding setting information indicates that nonlinear precoding is used, a demodulation process considering modulo calculation is performed on a received signal.

(4) According to the present invention, a wireless communication system includes: a plurality of terminal apparatuses; and a base station apparatus spatially multiplexing data destined for the plurality of terminal apparatuses by using multiuser MIMO transmission and transmitting the data. The base station apparatus includes nonlinear precoding setting information regarding whether to use nonlinear precoding in the multiuser MIMO transmission in a message of a radio resource control layer and notifies the plurality of terminal apparatuses of the nonlinear precoding setting information. The terminal apparatus receives the message of the radio resource control layer notified by the base station apparatus and acquires the nonlinear precoding setting information. When the acquired nonlinear precoding setting information indicates that nonlinear precoding is used, a received signal is blindly estimated to be a signal by linear precoding or a signal by the nonlinear precoding, one of a demodulation process considering no modulo calculation and a demodulation process considering modulo calculation is selected based on the estimation result, and the selected demodulation process is performed on the received signal.

(5) According to the present invention, a wireless communication system includes: a plurality of terminal apparatuses; and a base station apparatus spatially multiplexing data destined for the plurality of terminal apparatuses by using multiuser MIMO transmission and transmitting the data. The base station apparatus includes nonlinear precoding setting information regarding whether to use nonlinear precoding in the multiuser MIMO transmission in a message of a radio resource control layer and notifies the plurality of terminal apparatuses of the nonlinear precoding setting information. The terminal apparatus receives the message of the radio resource control layer notified by the base station apparatus and acquires the nonlinear precoding setting information. When the acquired nonlinear precoding setting information indicates that the nonlinear precoding is used, the demodulation process considering the modulo calculation is performed on the received signal.

(6) According to the present invention, an integrated circuit is mounted on a base station apparatus and causes the base station apparatus to have a plurality of functions. The integrated circuit causes the base station apparatus to have a series of functions including: a function of generating nonlinear precoding setting information regarding whether to use nonlinear precoding in multiuser MIMO transmission; and a function of notifying a terminal apparatus of the nonlinear precoding setting information as a message of a radio resource control layer.

(7) According to the present invention, an integrated circuit is mounted on a terminal apparatus and causes the terminal apparatus to have a plurality of functions. The integrated circuit causes the terminal apparatus to have a series of functions including: a function of acquiring nonlinear precoding setting information which is notified of as a message of a radio resource control layer by a base station apparatus and is information regarding whether to use nonlinear precoding; and a function of blindly estimating that a received signal is a signal by linear precoding or a signal by the nonlinear precoding, selecting one of a demodulation process considering no modulo calculation and a demodulation process considering modulo calculation based on the estimation result, and performing the selected demodulation process on the received signal when the nonlinear precoding setting information indicates that nonlinear precoding is used.

Advantageous Effects of Invention

It is possible to notify a terminal apparatus whether an MU-MIMO signal transmitted from a base station apparatus is linear precoding or nonlinear precoding by using efficient signaling.

BRIEF DESCRIPTION OF DRAWINGS

FIG. 9 is a sequence chart illustrating a communication example between the base station apparatus 200 and the terminal apparatus 400 according to a fourth embodiment of the present invention.

DESCRIPTION OF EMBODIMENTS

Figure 1:
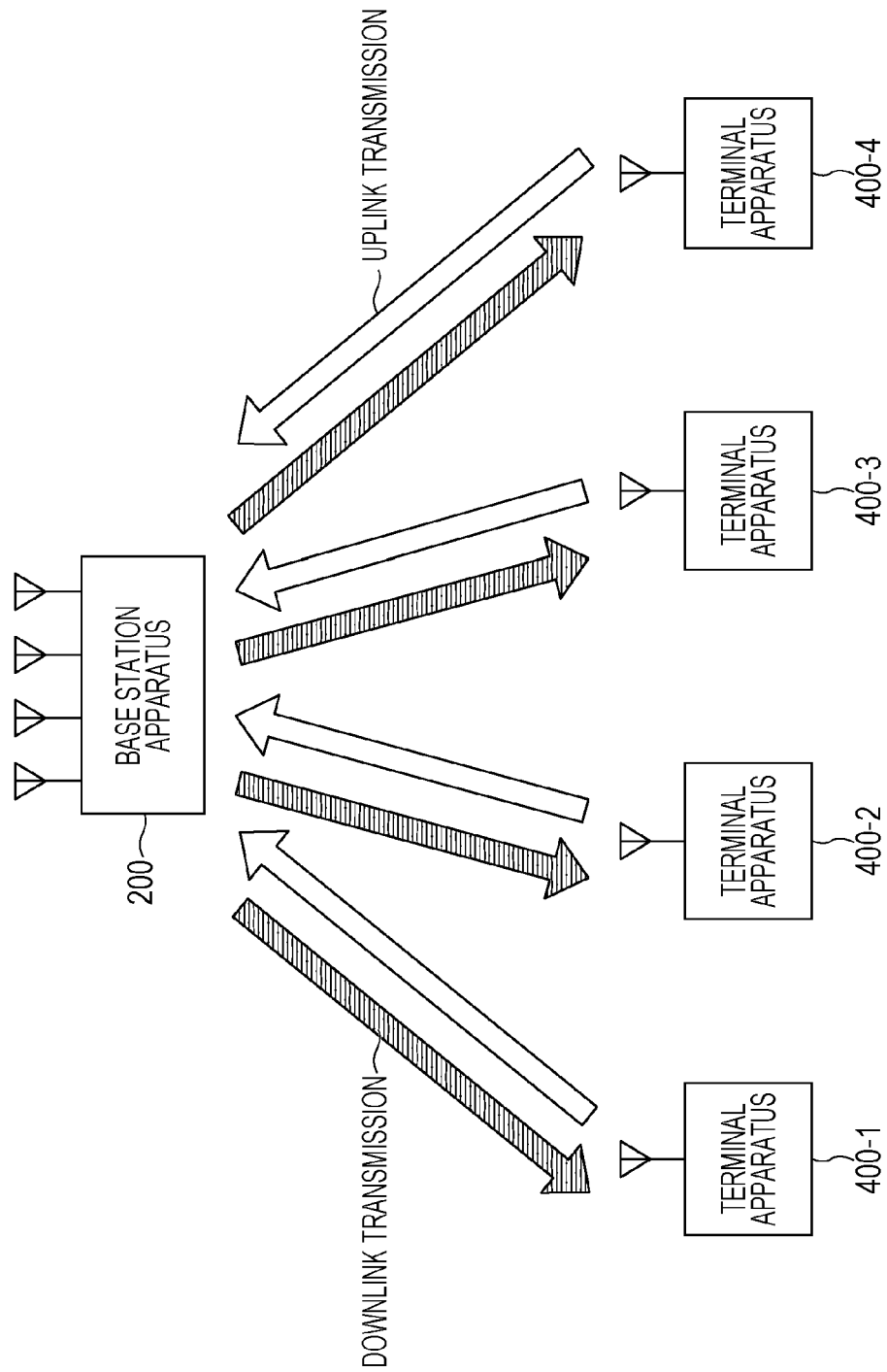
FIG. 1 is a schematic configuration diagram illustrating a configuration example of a wireless communication system according to the present invention.

First, main physical channels (or physical signals) used in LTE and LTE-A will be described. A channel means a medium used to transmit a signal and a physical channel means a physical medium used to transmit a signal. There is a possibility of the physical channels being changed or added in structures or format forms in future in LTE, LTE-A, and succeeding standards. In this case, however, there is no influence on the description of each embodiment of the present invention.

In LTE and LTE-A, scheduling of physical channels is managed using radio frames. One radio frame has 10 ms. One radio frame is configured to include 10 subframes. One subframe is configured to include 2 slots (that is, one slot has 0.5 ms). The scheduling for disposing the physical channels is managed using a resource block (RB) as a minimum unit. The resource block is defined as regions partitioned by constant frequency regions configured as a set of a plurality of subcarriers (for example, 12 subcarriers) in a frequency axis direction and time regions configured at constant transmission time intervals (1 slot) in a time axis direction.

Synchronization signals are configured to include 3 kinds of primary synchronization signals and secondary synchronization signals configured from 31 kinds of codes alternately disposed in the frequency regions. In combinations of the primary synchronization signals and the secondary synchronization signals, 504 cell identifiers (Physical Cell ID: Physical Cell Identity (PCI)) identifying base station apparatuses and frame timings for radio synchronization are shown. A terminal apparatus specifies the cell ID of a synchronization signal received through cell searching.

A Physical Broadcast CHannel (PBCH) is transmitted from a base station apparatus in order to notify terminal apparatuses of a control parameter (broadcast information (system information)) used commonly in the terminal apparatuses in a cell. Broadcast information not notified of with the physical broadcast channel is transmitted as a layer 3 message (system information) using a Physical Downlink Shared CHannel (PDSCH) by which a radio resource is notified of in a Physical Downlink Control CHannel (PDSCH). As the broadcast information, for example, a Cell Global Identifier (CGI) indicating the identifier of an individual cell, a Tracking Area Identifier (TAI) managing a standby area by paging, random access setting information (a transmission timing timer or the like), and a common radio resource setting information are notified of. The layer 3 message is a message of a control plane exchanged in a Radio Resource Control (RRC) layer of a terminal apparatus and a base station apparatus and is used as a message having the same meaning as RRC signaling or an RRC message.

Downlink reference signals are classified into a plurality of types in accordance with uses. For example, Cell-specific Reference Signals (CRSs) are pilot signals transmitted with predetermined power for each cell and are downlink reference signals periodically repeated in the frequency regions and the time regions based on predetermined rules. A terminal apparatus receives a cell-specific reference signal and measures reception quality for each cell. A terminal apparatus also uses a cell-specific reference signal as a signal referred to for the purpose of demodulating the physical downlink control channel and the physical downlink shared channel transmitted simultaneously with the cell-specific reference signal. A sequence which can be identified for each cell is used as a sequence used for the cell-specific reference signal.

A downlink reference signal is also used to estimate a downlink channel state. In the estimation of the channel state, cell-specific reference signals corresponding to up to 4 antennas are used. In addition to the cell-specific reference signals, channel state information reference signals (CSI-RS) corresponding to up to 8 antennas can be used in LTE-A.

As downlink reference signals set individually for each terminal apparatus, there are terminal-specific reference signals (UE-specific reference signals or DeModulation Reference Signals (DM-RS)). The terminal-specific reference signals are used to demodulate the physical downlink control channel or the physical downlink shared channel.

The physical downlink control channel is transmitted using several OFDM symbols from the head of each subframe and is used to report, for example, radio resource allocation information based on a scheduling result of a base station apparatus or information instructing a terminal apparatus of an increase or decrease adjustment amount of uplink transmission power. A terminal apparatus necessarily acquires radio resource allocation information called an uplink grant for uplink transmission and downlink grant (downlink assignment) for downlink reception by receiving downlink user data, receiving a layer 3 message (paging, a handover command, or the like) which is downlink control data, or monitoring and receiving the physical downlink control channel destined for an own terminal apparatus before transmission of uplink user data or the like. The physical downlink control channel can be configured to be transmitted with several OFDM symbols from the head of each subframe described above and can also be configured to be transmitted in regions of resource blocks allocated individually (dedicatedly) from a base station apparatus to a terminal apparatus.

A Physical Uplink Control CHannel (PUCCH) is used to report an ACKnowledgement (ACK) and a Negative ACKnowledgement (NACK or NAK) of data transmitted with the physical downlink shared channel, downlink channel state information (Channel State Information (CSI)), and a Scheduling Request (SR) which is an uplink radio resource allocation request (radio resource request). The CSI includes a Channel Quality Indicator (CQI), a Precoding Matrix Indicator (PMI), a Precoding Type Indicator (PTI), and a Rank Indicator (RI). Each indicator is written as indication in some cases, but has the same use and meaning.

A Physical Downlink Shared CHannel (PDSCH) is used to transmit downlink data and is also used to notify a terminal apparatus of broadcast information (system information) not notified of with paging or the physical broadcast channel as a layer 3 message. Radio resource allocation information of the physical downlink shared channel is shown in the physical downlink control channel.

A Physical Uplink Shared CHannel (PUSCH) is mainly used to transmit uplink data and uplink control data and can also include a downlink CSI or control data such as ACK/

NACK for downlink data. Not only is the uplink data transmitted, but the physical uplink shared channel is also used to notify a base station apparatus of uplink control information as a layer 3 message. Radio resource allocation information of the physical uplink shared channel is shown in the physical downlink control channel, as in the radio resource allocation information of the physical downlink shared channel.

An uplink reference signal (also referred to as an uplink pilot signal or an uplink pilot channel) includes a DeModulation Reference Signal (DM-RS) used by a base station apparatus to demodulate the physical uplink control channel and the physical uplink shared channel and a Sounding Reference Signal (SRS) mainly used by a base station apparatus to estimate an uplink channel state. As the sounding reference signal, there are a periodic sounding reference signal (Periodic SRS) and an aperiodic sounding reference signal (Aperiodic SRS).

A Physical Random Access CHannel (PRACH) is a channel used to report a preamble sequence and includes a guard time. The preamble sequences are configured so that 64 kinds of sequences are prepared and 6-bit information can be expressed. The physical random access channel is used as access means from a terminal apparatus to a base station apparatus. The terminal apparatus uses the physical random access channel to give a radio resource allocation request at the time of not setting the physical uplink control channel or to request the base station apparatus to transmit transmission timing adjustment information (also referred to as Timing Advance (TA)) necessary to match an uplink transmission timing with a reception timing window of the base station apparatus.

Physical channels other than the foregoing physical channels will not be described in detail since the physical channels are not related to each embodiment of the present invention.

A wireless communication system according to an embodiment of the present invention includes a base station apparatus (a transmission apparatus, a cell, a transmission point, a transmission antenna group, a transmission antenna port group, or an eNodeB) and a terminal apparatus (a mobile terminal, a reception point, a reception terminal, a reception apparatus, a reception antenna group, a reception antenna port group, or UE), and the base station apparatus performs data communication with the terminal apparatus. Therefore, control information and information data are transmitted via downlink.

Downlink control information is subjected to an error detection coding process and is mapped to a physical downlink control channel. The physical downlink control channel is subjected to an error correction coding process or a modulation process, and is transmitted and received via a first control channel (first physical downlink control channel) region or a second control channel (second physical downlink control channel) region different from the first control channel region. Hereinafter, a control channel mapped to the first control channel region is referred to as a first control channel and a control channel mapped to the second control channel region is referred to as a second control channel. The first control channel is also referred to as a PDCCH and the second control channel is also referred to as an enhanced PDCCH (ePDCCH).

From one viewpoint, the first control channel is a physical downlink control channel using the same transmission port (antenna port) as a cell-specific reference signal. The second control channel is a physical downlink control channel using the same transmission port as a terminal-specific reference signal. The terminal apparatus demodulates the first control channel using the cell-specific reference signal and demodulates the second control channel using the terminal-specific reference signal.

Since the cell-specific reference signal is a reference signal common to all of the terminal apparatuses in a cell and is inserted into almost all of the resource blocks, the cell-specific reference signal is a reference signal which can be used by any terminal apparatus. Therefore, the first control channel can be demodulated by any terminal apparatus.

On the other hand, the terminal-specific reference signal is a reference signal which is inserted into only allocated resources and is adaptively subjected to a precoding process or a beamforming process, as in data. In this case, a control channel disposed in the second control region can obtain a gain of adaptive precoding or beamforming or a frequency scheduling gain. The terminal-specific reference signal can also be common to a plurality of terminal apparatuses. For example, when control channels disposed in the second control channel region are distributed in a plurality of resources (for example, resource blocks) and notified of, the terminal-specific reference signal of the second control channel region can be common to the plurality of terminal apparatuses. In this case, the control channel disposed in the second control channel region can obtain a frequency diversity gain.

From another viewpoint, the control channel (the first control channel) mapped to the first control channel region is a physical downlink control channel on an OFDM symbol located at a front portion of a physical subframe and can be disposed in all portions of a system bandwidth (Component Carrier (CC)) on the OFDM symbol.

The control channel (the second control channel) mapped to the second control channel region is a physical downlink control channel on an OFDM symbol located on the rear side of the first control channel on a physical subframe and can be disposed in some bands of a system bandwidth on the OFDM symbol.

The first control channel is disposed on an OFDM symbol dedicated for a control channel located at a front portion of a physical subframe, and thus can be received and demodulated before an OFDM symbol at the rear portion of a physical data channel. A terminal apparatus monitoring only the OFDM symbol dedicated for the control channel can also receive the first control channel. Since the first control channel can be dispersed and disposed in all portions of the CC bandwidth, inter-cell interference can be randomized. The first control channel is a region set uniquely for a base station apparatus (cell) and is a region common to all the terminal apparatuses connected to the base station apparatus.

On the other hand, the second control channel is disposed on an OFDM symbol at the rear portion of a physical downlink shared channel (physical data channel) normally received by a terminal apparatus during communication (during connection). By performing frequency division multiplexing, the second control channels and the second control channel and the physical data channel can be subjected to orthogonal multiplexing (multiplexing with no interference). The second control channel region is a region set uniquely for a terminal apparatus and is a region set for each terminal apparatus connected to a base station apparatus. The base station apparatus can be set such that the second control channel is common to a plurality of terminal apparatuses. The first control channel region and the second control channel region are disposed in the same physical subframe. Here, the OFDM symbol is units of time directions in which bits of each channel are mapped.

From another viewpoint, the first control channel is a cell-specific physical downlink control channel and is a physical channel in which both of a terminal apparatus in an idle state and a terminal apparatus in a connection state (connection state) can be acquired (detected). The second control channel is a terminal-specific physical downlink control channel and is a physical channel in which only a terminal apparatus in the connection state can be acquired. Here, the idle state is a state (RRC_IDLE state) in which information regarding Radio Resource Control (RRC) is not accumulated by a base station apparatus or a state in which data is not instantly transmitted and received, such as a state in which a terminal apparatus performs discontinuous reception (DRX). On the other hand, the connection state is a state in which data can be instantly transmitted and received, such as a state (RRC_CONNECTED state or a connection state) in which a terminal apparatus holds network information or a state in which a terminal apparatus does not perform discontinuous reception (DRX). The first control channel is a channel which can be received by a terminal apparatus without depending on terminal-specific RRC signaling. The second control channel is a channel set by the terminal apparatus by the terminal-specific RRC signaling and is a channel which can be received by the terminal-specific RRC signaling. That is, the first control channel is a channel which can be received by any terminal apparatus by pre-restricted setting and the second control channel is a channel in which terminal-specific setting is easily changed.

Hereinafter, communication technologies according to embodiments of the present invention will be described with reference to the drawings.

First Embodiment

A communication technology according to a first embodiment of the present invention will be described. In the embodiment, a wireless communication system in which a base station apparatus selects a plurality of terminal apparatuses among terminal apparatuses in a connection state with the own base station apparatus, and then spatially multiplexes transmission data destined for the plurality of terminal apparatuses by MU-MIMO and transmits the transmission data will be described as an example. Further, a system in which inter-user interference (IUI) occurring between a spatial stream[01] for transmitting the transmission data destined for each terminal apparatus is suppressed in advance by linear precoding or nonlinear precoding for transmission will be described as an example.

FIG. 1 is a schematic configuration diagram illustrating a configuration example of a wireless communication system according to the present embodiment. As illustrated in FIG. 1, the wireless communication system according to the embodiment is a wireless communication system in which a base station apparatus 200 performs MU-MIMO transmission in such a manner that the base station apparatus 200 communicates with a plurality of terminal apparatuses 400 (for example, a first terminal apparatus 400-1 to a fourth terminal apparatus 400-4) using uplink transmission and downlink transmission, and the base station apparatus 200 selects a plurality of terminal apparatuses 400 (for example, the first terminal apparatus 400-1 and the second terminal apparatus 400-2) from among the terminal apparatuses 400 and spatially multiplexes transmission data (codewords) destined for the plurality of terminal apparatuses 400 at the same time and the same frequency band in the downlink transmission for simultaneous communication.

Each of the terminal apparatuses 400-1 to 400-4 receives at least one of a cell-specific reference signal and a channel state information reference signal transmitted from the base station apparatus 200, estimates a downlink channel state between each transmission antenna of the base station apparatus 200 and each reception antenna of the own terminal apparatus 400, and reports channel state information (CSI) to the base station apparatus 200 through uplink transmission based on the channel state. The base station apparatus 200 performs the MU-MIMO transmission in such a manner that the base station apparatus 200 selects a plurality of terminal apparatuses 400 based on the CSI or the like reported from each terminal apparatus 400 and spatially multiplexes the transmission data destined for the plurality of terminal apparatuses 400 for simultaneous transmission.

As a wireless access scheme, for example, Orthogonal Frequency Division Multiple Access (OFDMA) is used for downlink transmission and Single Carrier Frequency Division Multiple Access (SC-FDMA) is used for uplink transmission in LTE and LTE-A. Even in the embodiment, a wireless communication system in which the foregoing radio access scheme is used will be described as an example, but the present invention is not limited thereto. For example, the OFDM in which frequency division multiple connection is not performed may be used or the OFDMA may be used for both of uplink and downlink transmissions.

Figure 2:
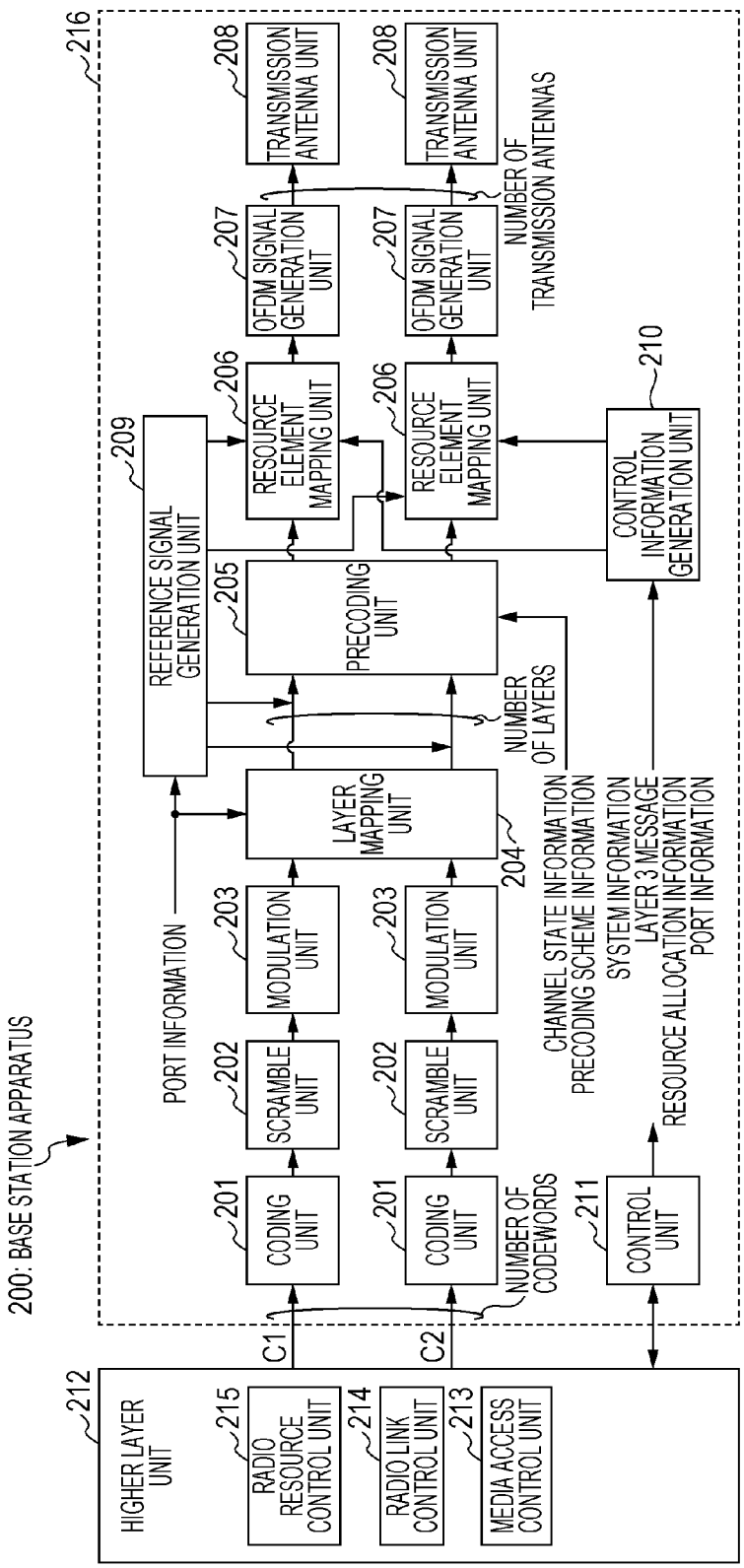
FIG. 2 is a functional block diagram illustrating a configuration example of a base station apparatus 200 according to a first embodiment of the present invention.

FIG. 2 is a functional block diagram illustrating a configuration example of the base station apparatus 200 according to the embodiment. In FIG. 2, the base station apparatus 200 is configured to include a higher layer unit 212 and a physical layer unit 216 that includes a coding unit 201, a scramble unit 202, a modulation unit 203, a layer mapping unit 204, a precoding unit 205, a resource element mapping unit 206, an OFDM signal generation unit 207, a transmission antenna unit 208, a reference signal generation unit 209, a control information generation unit 210, and a control unit 211. The higher layer unit 212 includes a media access control unit 213, a radio link control unit 214, and a radio resource control unit 215.

The higher layer unit 212 decides radio resource allocation (scheduling) of the physical downlink control channel and the physical downlink shared channel based on a kind of transmission data destined for each terminal apparatus 400 and the amount of data, Quality of Service (QoS) such as a required data rate, priority, or an allowable delay time, and the channel state information reported from each terminal apparatus 400. In the scheduling, the higher layer unit 212 allocates radio resources such as the physical downlink shared channel to transmission data destined for a plurality of terminal apparatuses determined to perform spatial multiplexing and simultaneous transmission using the MU-MIMO. The higher layer unit 212 may allocate control information destined for the plurality of terminal apparatuses to radio resources such as the second physical downlink control channel (ePDCCH) and perform spatial multiplexing using the MU-MIMO.

In the embodiment, a case in which a codeword C1 which is the transmission data destined for the first terminal apparatus 400-1 and a codeword C2 which is transmission data destined for the second terminal apparatus 400-2 are allocated to the same radio resource by performing the spatial multiplexing using the MU-MIMO will be described as an example.

The control unit 211 controls each unit of the physical layer unit 216 based on the control signal input from the higher layer unit 212.

The coding unit 201 performs error correction coding and a rate matching process (puncturing process) on each codeword input from the higher layer unit 212.

The scramble unit 202 performs a scramble process on the result of the error correction coding and the rate matching process of each codeword output from the coding unit 201 to multiply (superimpose) scrambling codes.

The modulation unit 203 performs a modulation process such as Phase Shift Keying (PSK) modulation or Quadrature Amplitude Modulation (QAM) (orthogonal amplitude modulation) on each scramble result output from the scramble unit 202 and outputs a modulation symbol sequence corresponding to each codeword.

The layer mapping unit 204 distributes the modulation symbol sequence output from the modulation unit 203 to each layer of the MU-MIMO with reference to port information input from the higher layer unit 212 or the control unit 211.

The reference signal generation unit 209 further generates a cell-specific reference signal and a channel state information reference signal, as necessary, with reference to the cell identifier (a cell ID or the physical layer cell identity) and the port information input from the higher layer unit 212 or the control unit 211 and further generates a terminal-specific reference signal with reference to the terminal identifier (a terminal ID, a UE-ID, or a radio network temporary identifier). The reference signal generation unit 209 inputs the terminal-specific reference signal of each of the generated antenna ports (for each layer) to the precoding unit 205 along with the modulation symbol sequence of each layer output by the layer mapping unit 204. The reference signal generation unit 209 inputs the generated cell-specific reference signal and channel state information reference signal to the resource element mapping unit 206.

The control information generation unit 210 generates broadcast information from the system information or the like input from the higher layer unit 212 and generates downlink control information from control information such as the layer 3 message, the radio resource allocation result (resource allocation information), transmission mode information, and the port information input from the higher layer unit 212 and the control unit 211.

The precoding unit 205 performs a linear precoding process (for example, multiplication of a precoding matrix) or a nonlinear precoding process (for example, addition of a perturbation vector and multiplication of a precoding matrix) on the modulation symbol sequence of each layer output from the layer mapping unit 204 with reference to the channel state information and the precoding scheme information input from the higher layer unit 212 or the control unit 211, performs the same precoding process as the modulation symbol sequence on the terminal-specific reference signal generated by the reference signal generation unit 209, and outputs the processing results. Even when the nonlinear precoding process is performed on the modulation symbol sequence, only the same multiplication of the precoding matrix as the modulation symbol sequence is preferably preformed without adding the perturbation vector on the terminal-specific reference signal, but the present invention is not limited thereto.

The resource element mapping unit 206 maps the modulation symbol sequence precoded by the precoding unit 205, the cell-specific reference signal and the channel state information reference signal generated by the reference signal generation unit 209, and the broadcast information and the control information generated by the control information generation unit 210 to predetermined resource elements or the resource elements of the radio resource allocation result in the higher layer unit 212, and then outputs the resource element group. Here, when the reference signal is mapped, multiplexing is preferably performed by frequency division multiplying, time division multiplexing, code division multiplexing, or a combination thereof so that the reference signals of the ports are mutually orthogonal.

The OFDM signal generation unit 207 converts the resource element group output from the resource element mapping unit 206 into an OFDM signal and transmits the OFDM signal as a downlink transmission signal from the transmission antenna unit 208.

Figure 3:
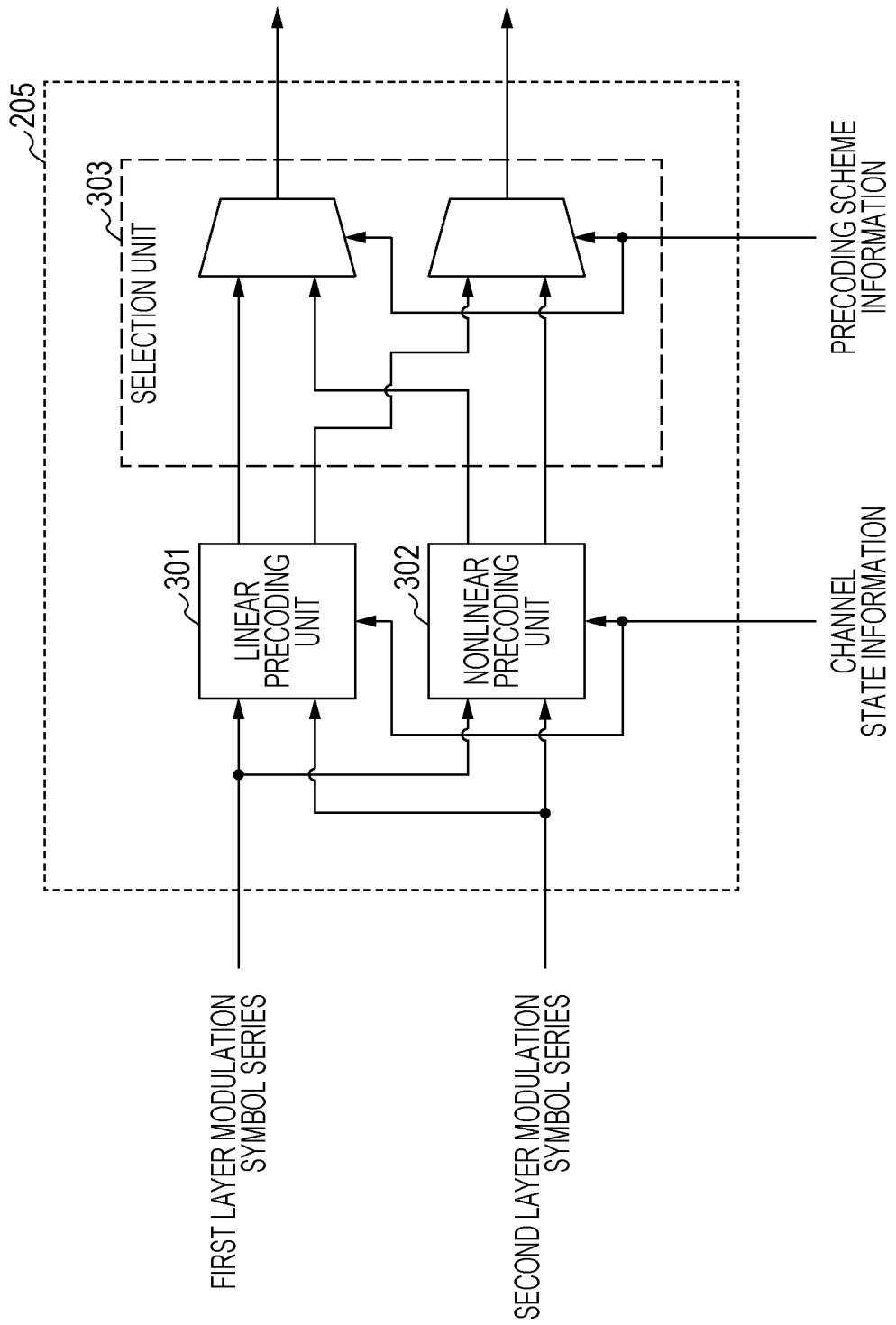
FIG. 3 is a functional block diagram illustrating a configuration example of a precoding unit 205 according to the first embodiment of the present invention.

FIG. 3 is a functional block diagram illustrating a configuration example of the precoding unit 205 according to the embodiment.

In FIG. 3, the precoding unit 205 is configured to include a linear precoding unit 301, a nonlinear precoding unit 302, and a selection unit 303.

The linear precoding unit 301 performs linear precoding on the modulation symbol sequence of each layer output from the layer mapping unit 204 based on the channel state information and outputs a linear precoding result.

The nonlinear precoding unit 302 performs nonlinear precoding on the modulation symbol sequence of each layer output from the layer mapping unit 204 based on the channel state information and outputs a nonlinear precoding result.

The selection unit 303 selects one of the linear precoding result output from the linear precoding unit 301 and the nonlinear precoding result output from the nonlinear precoding unit 302 based on the precoding scheme information input from the higher layer unit 212 or the control unit 211, and then outputs the selected result. The configuration of the precoding unit 205 is not limited to the foregoing configuration. For example, only one of the linear precoding unit 301 and the nonlinear precoding unit 302 may be selected based on the precoding scheme information input from the higher layer unit 212 or the control unit 211 so that the selected precoding unit may operate.

Figure 4:
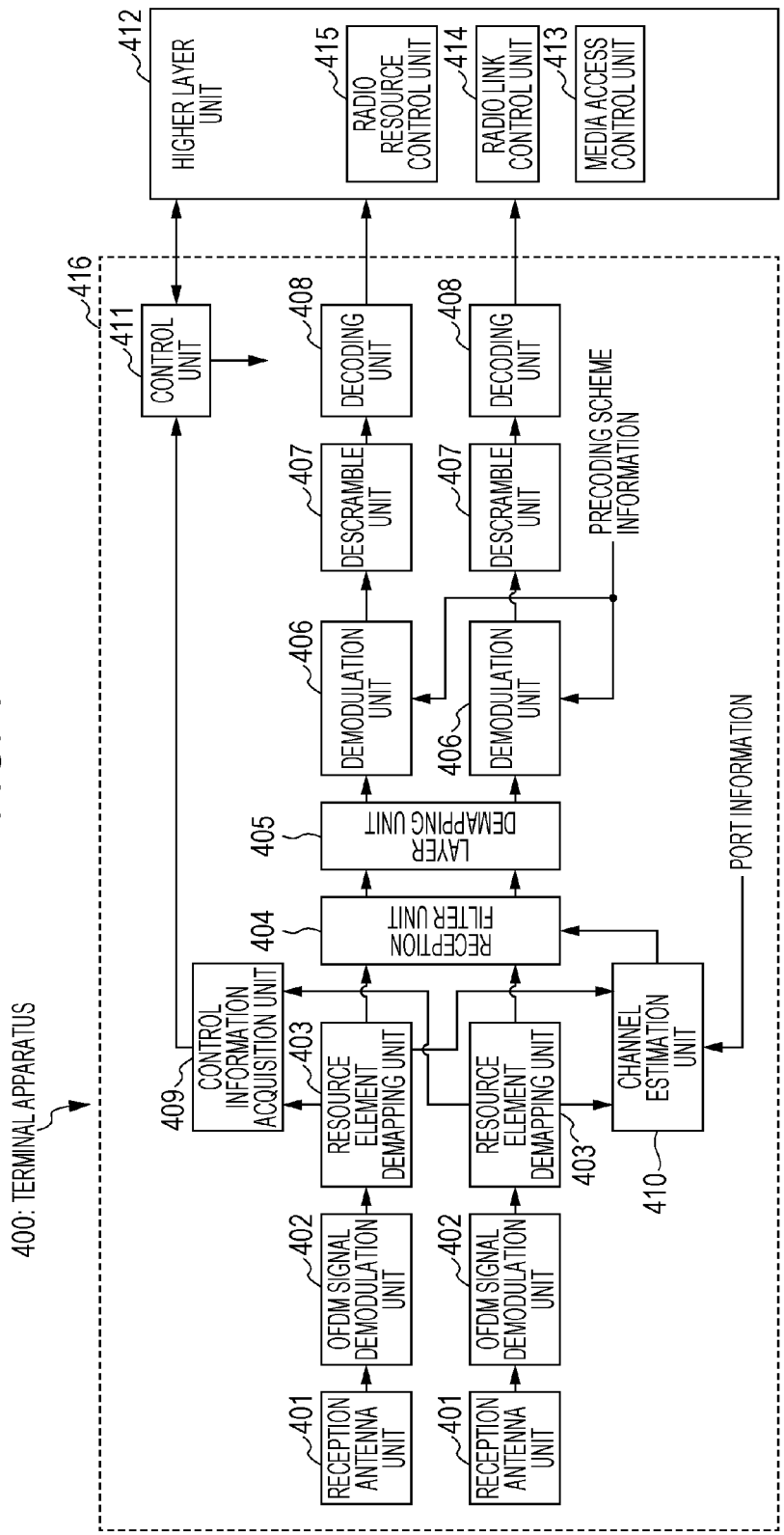
FIG. 4 is a functional block diagram illustrating a configuration example of a terminal apparatus 400 according to the first embodiment of the present invention.

FIG. 4 is a functional block diagram illustrating a configuration example of the terminal apparatus 400 according to the embodiment. In FIG. 4, the terminal apparatus 400 is configured to include a higher layer unit 412 and a physical layer unit 416 that includes a reception antenna unit 401, an OFDM signal demodulation unit 402, a resource element demapping unit 403, a reception filter unit 404, a layer demapping unit 405, a demodulation unit 406, a descramble unit 407, a decoding unit 408, a control information acquisition unit 409, a channel estimation unit 410, and a control unit 411. The higher layer unit 412 includes a media access control unit 413, a radio link control unit 414, and a radio resource control unit 415.

The OFDM signal demodulation unit 402 performs an OFDM demodulation process on the downlink received signal received by the reception antenna unit 401 and outputs a resource block group.

The resource element demapping unit 403 first acquires (demaps) and outputs the broadcast information and the downlink control information from the resource element at a predetermined position. Here, as a method of identifying the control information regarding the own terminal apparatus, various methods can be used. A method of using blind decoding will be described as an example. In this method, for example, by adding information identifying each terminal apparatus as Cyclic Redundancy Check (CRC) to the side of the base station apparatus 200 in regard to the control information regarding each terminal apparatus and demodulating all of the possible control information, it is possible to identify the control information regarding the own terminal apparatus.

Next, the resource element demapping unit 403 acquires the reference signal from the resource element at the predetermined position with reference to the port information acquired as the control information by the control information acquisition unit 409 and outputs the reference signal to the channel estimation unit 410. Here, when the reference signal is acquired, a process corresponding to the process in the resource element mapping unit 206 of the base station apparatus 200 is performed. More specifically, when the frequency division multiplexing, the time division multiplexing, the code division multiplexing, and the like are applied so that the reference signals of the ports in the resource element mapping unit 206 are mutually orthogonal, demapping or despreading is performed in consideration thereof.

The resource element demapping unit 403 acquires a received signal destined for the own terminal apparatus based on the resource allocation information output from the control information acquisition unit 409.

The control information acquisition unit 409 acquires the control information such as the system information and the layer 3 message reported from the base station apparatus 200, the resource allocation information, the transmission mode information, and the port information from the broadcast information and the downlink control information output from the resource element demapping unit 403.

The channel estimation unit 410 estimates a channel (a channel or a transmission path) of each port by multiplying the reference signal of each port output from the resource element demapping unit 403 by a sequence (a sequence or the like of a complex conjugate of the reference signal sequence) corresponding to the reference signal sequence of each port generated by the reference signal generation unit 209 of the base station apparatus 200. Here, since the reference signal is subjected to precoding in the base station apparatus 200, an equivalent channel state also including the precoding process is estimated in addition to a channel between the transmission antenna of the base station apparatus 200 and the reception antenna of the terminal apparatus 400.

The reception filter unit 404 performs a filtering process (channel equalization, reception combining, MIMO separation, or the like) on the received signal output from the resource element demapping unit 403 by using the estimation result of the channel state output from the channel estimation unit 410. The filtering process in the reception filter unit 404 may include, for example, MIMO separation of detecting a signal of each layer (port) by using a method such as Zero Forcing (ZF), Minimum Mean Square Error (MMSE), or Maximum Likelihood Detection (MLD).

The layer demapping unit 405 converts the received signal of each layer after the filtering process output from the reception filter unit 404 into a modulation symbol sequence of each codeword by performing a concatenation process corresponding to the process of the layer mapping unit 204 of the base station apparatus 200, and then outputs the modulation symbol sequence.

The demodulation unit 406 performs a demodulation process corresponding to the modulation process of the modulation unit 203 of the base station apparatus 200 on the modulation symbol sequence of each codeword output from the layer demapping unit 405 and outputs a coded sequence (or a soft decision bit sequence). At this time, when the precoding scheme information input from the higher layer unit 412 or the control unit 411 indicates the nonlinear precoding, the demodulation unit 406 performs modulo calculation by a modulo width decided in advance in correspondence with the modulation scheme on the modulation symbol sequence, and then a demodulation process by soft decision of calculating a logarithm likelihood ratio from a reception signal point and candidate signal points of signal point constellation in the modulation scheme. Alternatively, the demodulation unit 406 may perform a demodulation process by soft decision of calculating a logarithm likelihood ratio from a reception signal point and candidate signal points repeated with a modulo width in consideration of addition of the perturbation vector in the precoding unit 205 of the base station apparatus 200 instead of performing the modulo calculation. Hereinafter, such demodulation processes are collectively referred to as a demodulation process considering modulo calculation.

The descramble unit 407 multiplies the coded sequence output from the demodulation unit 406 by a complex conjugate of a scrambling code used by the scramble unit 202 of the base station apparatus 200 or divides the coded sequence by the scrambling code, and then outputs the coded sequence after the descramble.

The decoding unit 408 performs a rate matching process (depuncturing process) and an error correction decoding process on the coded sequence after the descramble output from the descramble unit 407, and then outputs the received data sequence.

The control unit 411 controls each of the foregoing units of the physical layer based on the control information output from the control information acquisition unit 409 and an instruction input from the higher layer unit 412.

The higher layer unit 412 controls the physical layer based on the system information and the control information output from the control information acquisition unit 409 and performs a process such as error detection or a retransmission request on the received data sequence output from the decoding unit 408. In particular, the higher layer unit 412 according to the embodiment generates and outputs the precoding scheme information based on the nonlinear precoding setting information included in the system information output from the control information acquisition unit 409.

Figure 5:
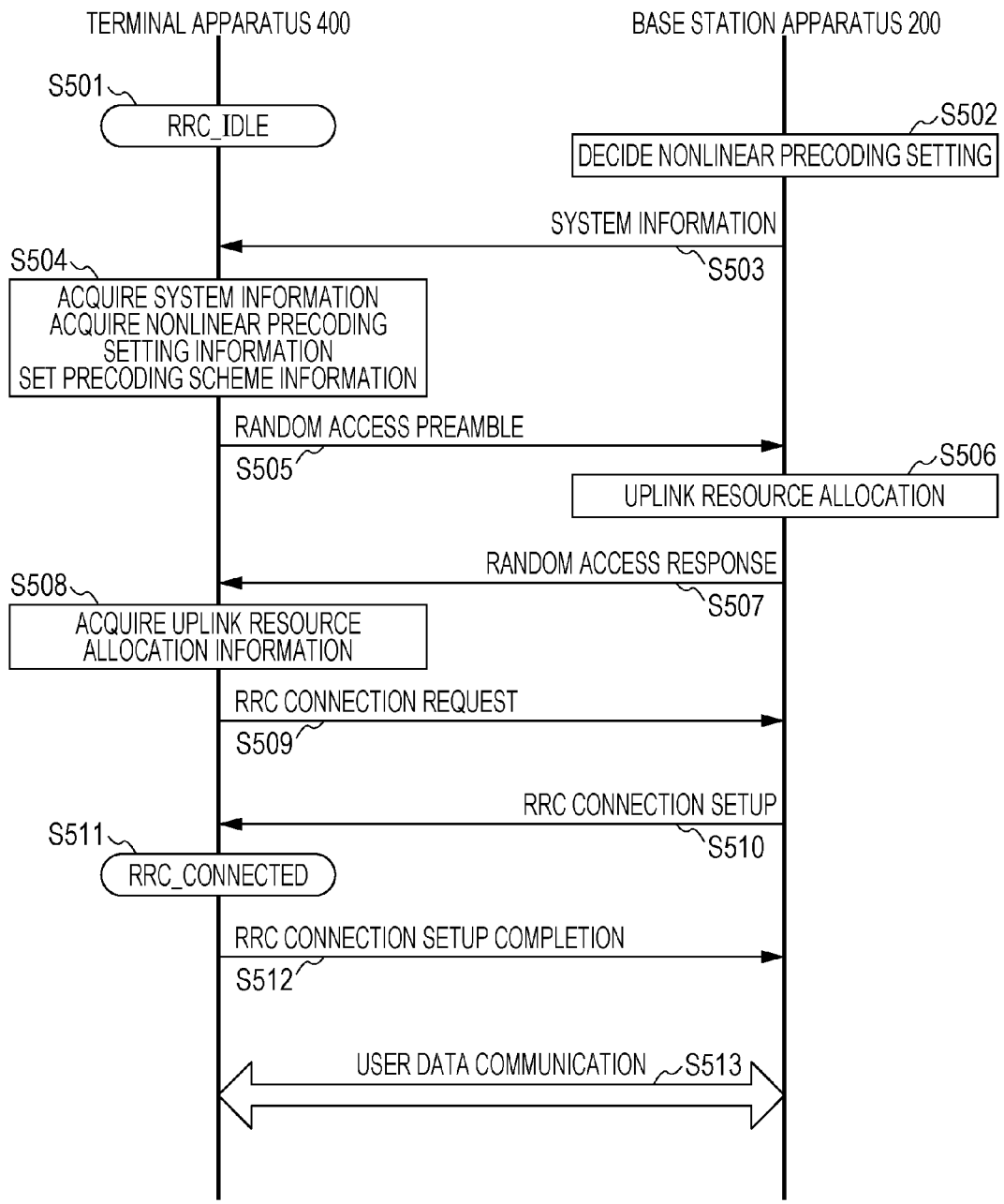
FIG. 5 is a sequence chart illustrating a communication example between the base station apparatus 200 and the terminal apparatus 400 according to the first embodiment of the present invention.

FIG. 5 is a sequence chart illustrating a communication example between the base station apparatus 200 and the terminal apparatus 400 according to the present embodiment.

First, the terminal apparatus 400 is assumed to be in an idle state (RRC_IDLE state) (step S501).

The base station apparatus 200 decides nonlinear precoding setting of whether to use the nonlinear precoding in a cell (own cell) (ON or OFF) formed by the own base station apparatus (step S502) and includes information regarding the decided nonlinear precoding setting (nonlinear precoding setting information) in the system information to broadcast the nonlinear precoding setting using a physical broadcast channel or the like (step S503). Hereinafter, setting for using (validating) the nonlinear precoding is expressed as ON of the nonlinear precoding setting and setting for not using (invalidating) the nonlinear precoding is expressed as OFF of the nonlinear precoding setting.

The terminal apparatus 400 performs cell searching at the time of start of communication, receives the physical broadcast channel broadcasted from the base station apparatus 200 which is a connection destination candidate to acquire the system information, acquires the nonlinear precoding setting information in the cell, and sets the precoding scheme information based on the acquired nonlinear precoding setting information (step S504).

When the terminal apparatus 400 requests the base station apparatus 200 detected by the cell searching to establish connection, the terminal apparatus 400 first transmits the random access preamble using the physical random access channel to make a request for resource allocation for the purpose of uplink transmission (step S505).

When the base station apparatus 200 receives the random access preamble transmitted from the terminal apparatus 400 and transmitted to make the request for the uplink resource allocation, the base station apparatus 200 performs uplink resource allocation to the terminal apparatus 400 (step S506) and transmits a random access response including the allocation information using the physical downlink shared channel (step S507).

The terminal apparatus 400 receives the random access response transmitted from the base station apparatus 200 and acquires the uplink resource allocation information regarding the own terminal apparatus (step S508).

The terminal apparatus 400 transmits an RRC connection request message including the identification information of the own terminal apparatus to give a connection request to the base station apparatus 200 using the allocated uplink resource (the resource of the physical uplink shared channel) (step S509).

When the base station apparatus 200 receives the RRC connection request message transmitted from the terminal apparatus 400, the base station apparatus 200 sets a Signaling Radio Bearer (SRB) used to transmit and receive a communication control message to and from the terminal apparatus 400 and transmits an RRC connection setup message including information regarding the SRB, configuration information of the physical channels, and various kinds of setting information regarding the terminal apparatus 400 by using the physical downlink shared channel (step S510).

When the terminal apparatus 400 receives the RRC connection setup message transmitted from the base station apparatus 200, the terminal apparatus 400 transitions the RRC_IDLE state to a state (an RRC_CONNECTED state or a connection state) in which network information is held (step S511).

The terminal apparatus 400 transmits an RRC connection setup complete message indicating completion of a connection procedure by using the physical uplink shared channel (step S512).

Thereafter, user data communication between the base station apparatus 200 and the terminal apparatus 400 is performed (step S513). The terminal apparatus 400 performs a demodulation process based on the precoding scheme information set in step S504 at the time of reception of the downlink user data (reception of the physical downlink shared channel).

Figure 6:
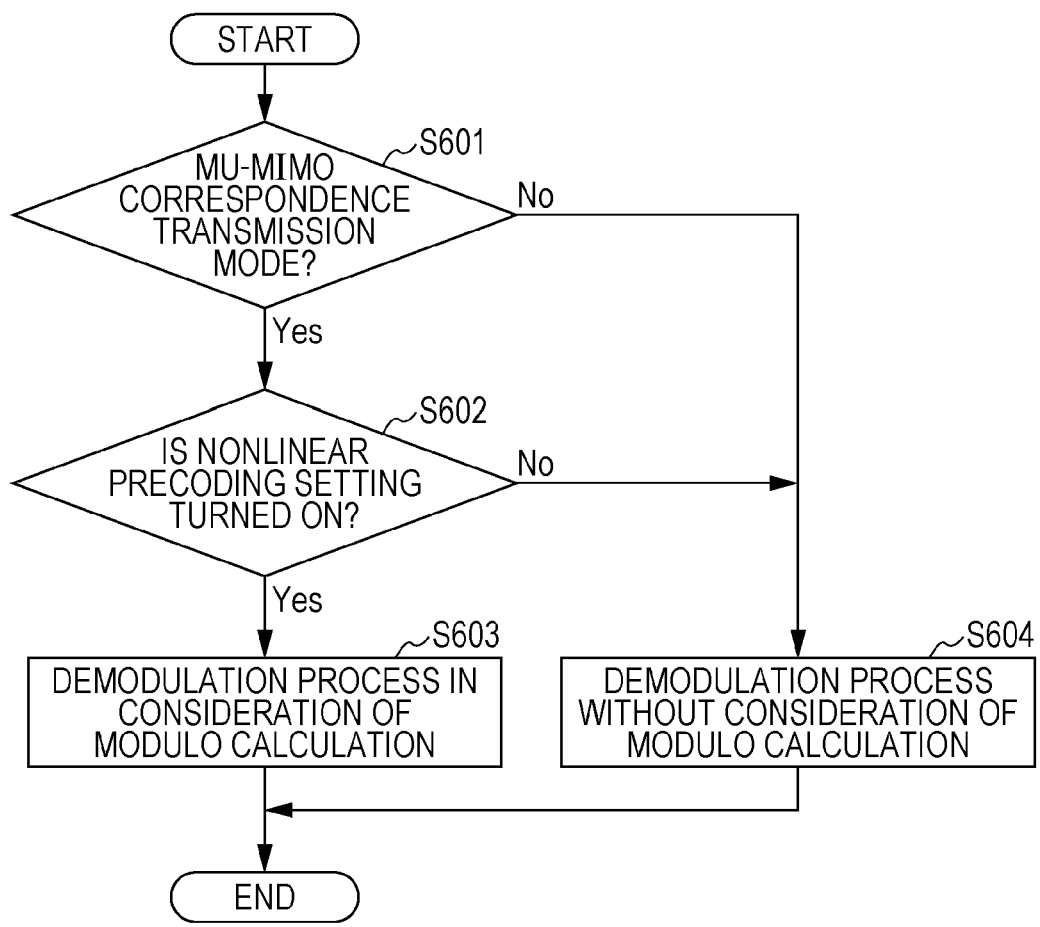
FIG. 6 is a flowchart illustrating a flow example of a demodulation process in the terminal apparatus 400 according to the first embodiment of the present invention.

FIG. 6 is a flowchart illustrating a flow example of a demodulation process in the terminal apparatus 400 according to the present embodiment. FIG. 6 illustrates a flow example of a demodulation process at the time of reception of user data when the terminal apparatus 400 detects that the user data destined for the own terminal apparatus is transmitted using the physical downlink shared channel based on the resource allocation information acquired from the physical downlink control channel or the enhanced physical downlink control channel.

First, the terminal apparatus 400 confirms the transmission mode information regarding the user data destined for the own terminal apparatus (step S601).

When the transmission mode information regarding the user data destined for the own terminal apparatus indicates a transmission mode (for example, transmission mode 5, 8, 9, or 10) supporting the MU-MIMO (Yes in step S601) and further when the nonlinear precoding setting is ON (the precoding scheme information indicates the nonlinear precoding) (Yes in step S602), the terminal apparatus 400 performs the demodulation process considering modulo calculation on the received signal (step S603).

When the transmission mode information regarding the user data destined for the own terminal apparatus indicates a transmission mode supporting no MU-MIMO (No in step S601) or when the nonlinear precoding setting is OFF (No in step S602), the terminal apparatus 400 performs the demodulation process considering no modulo calculation on the received signal (step S604).

When the terminal apparatus 400 notifies the base station apparatus 200 of a CSI typified by the channel quality indicator (CQI) or a precoding matrix indicator (PMI), the terminal apparatus 400 calculates information to be notified of based on the nonlinear precoding setting information. For example, when the nonlinear precoding setting is ON, the terminal apparatus 400 calculate the CQI or the PMI on the assumption that the demodulation process considering modulo calculation is performed on the received signal and notifies the base station apparatus 200 of the CQI or the PMI.

The terminal apparatus 400 can calculate the CSI of which the base station apparatus 200 is notified based on a plurality of CQI tables (tables), PMI tables, or the like in which CQI values or PMI values are described and which is shared in advance with the base station apparatus 200. The terminal apparatus 400 can share the plurality of CQI tables or PMI tables with the base station apparatus 200. For example, a CQI value can be described in one of the plurality of CQI tables on the assumption that the demodulation process considering modulo calculation is performed and a CQI value can be described in another CQI table on the assumption that the demodulation process considering modulo calculation is not performed. The terminal apparatus 400 can decide the CQI table to be used to notify the base station apparatus 200 of the CSI among the plurality of CQI tables based on the nonlinear precoding setting information.

In the embodiment, as described above, the base station apparatus 200 decides whether to use the nonlinear precoding in the own cell and includes the decided nonlinear precoding setting information in the system information to broadcast the system information using the physical broadcast channel or the like. The terminal apparatus 400 acquires the nonlinear precoding setting information from the broadcasted system information and performs the demodulation process on the user data destined for the own terminal apparatus based on the acquired nonlinear precoding setting information. Thus, the terminal apparatus 400 can appropriately determine whether the MU-MIMO signal transmitted from the base station apparatus 200 is linear-preceded or nonlinear-precoded and can receive and demodulate the signal.

Second Embodiment

A schematic configuration example of a wireless communication system according to the present embodiment is illustrated in FIG. 1 as in the first embodiment. The configuration of a base station apparatus 200 is the same as that of FIG. 2 and the configuration of a terminal apparatus 400 is the same as that of FIG. 4. A process corresponding to control information is different. Hereinafter, different points between the wireless communication systems according to the embodiment and the first embodiment will be described. The description of the same point will be omitted.

Figure 7:
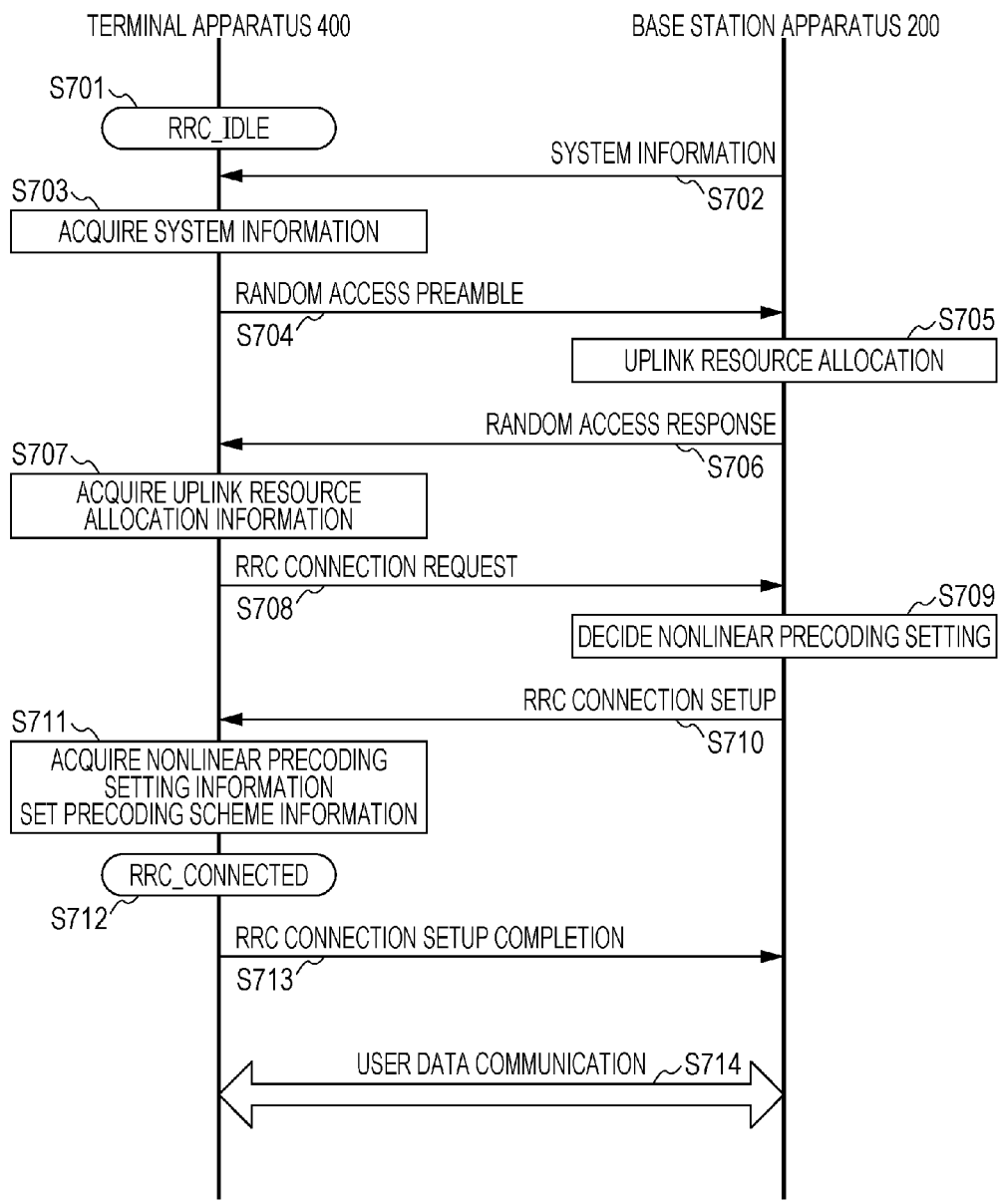
FIG. 7 is a sequence chart illustrating a communication example between the base station apparatus 200 and the terminal apparatus 400 according to a second embodiment of the present invention.

FIG. 7 is a sequence chart illustrating a communication example between the base station apparatus 200 and the terminal apparatus 400 according to the present embodiment.

First, the terminal apparatus 400 is assumed to be in an idle state (RRC_IDLE state) (step S701).

The base station apparatus 200 broadcasts system information regarding the own cell by using the physical broadcast channel or the like (step S702).

The terminal apparatus 400 performs cell searching at the time of start of communication and receives the physical broadcast channel broadcasted from the base station apparatus 200 which is a connection destination candidate to acquire the system information (step S703).

When the terminal apparatus 400 requests the base station apparatus 200 detected by the cell searching to establish connection, the terminal apparatus 400 first transmits the random access preamble using the physical random access channel to make a request for resource allocation for the purpose of uplink transmission (step S704).

When the base station apparatus 200 receives the random access preamble transmitted from the terminal apparatus 400 and transmitted to make the request for the uplink resource allocation, the base station apparatus 200 performs uplink resource allocation to the terminal apparatus 400 (step S705) and transmits a random access response including the allocation information using the physical downlink shared channel (step S706).

The terminal apparatus 400 receives the random access response transmitted from the base station apparatus 200 and acquires the uplink resource allocation information regarding the own terminal apparatus (step S707).

The terminal apparatus 400 transmits an RRC connection request message including the identification information of the own terminal apparatus to give a connection request to the base station apparatus 200 using the allocated uplink resource (the resource of the physical uplink shared channel) by using the physical uplink shared channel (step S708).

When the base station apparatus 200 receives the RRC connection request message transmitted from the terminal apparatus 400, the base station apparatus 200 decides the nonlinear precoding setting of whether to use the nonlinear precoding for the terminal apparatus 400 (ON or OFF) (step S709). Further, a Signaling Radio Bearer (SRB) used to transmit and receive a communication control message to and from the terminal apparatus 400 is set, an RRC connection setup message which is a connection setting message including information (nonlinear precoding setting information) regarding the decided nonlinear precoding setting, information regarding the SRB, configuration information of the physical channels, and various kinds of setting information regarding the terminal apparatus 400 is transmitted using the physical downlink shared channel (step S710).

When the terminal apparatus 400 receives the RRC connection setup message transmitted from the base station apparatus 200, the terminal apparatus 400 acquires the nonlinear precoding setting information included in the RRC connection setup message and sets the precoding scheme information based on the acquired nonlinear precoding setting information (step S711), and then transitions the RRC_IDLE state to a state (an RRC_CONNECTED state or a connection state) in which network information is held (step S712).

The terminal apparatus 400 transmits an RRC connection setup complete message indicating completion of a connection procedure by using the physical uplink shared channel (step S713).

Thereafter, user data communication is performed between the base station apparatus 200 and the terminal apparatus 400 (step S714). The terminal apparatus 400 performs a demodulation process based on the precoding scheme information set in step S711 at the time of reception of the downlink user data (reception of the physical downlink shared channel).

A flow example of the demodulation process in the terminal apparatus 400 according to the embodiment is the same as that of FIG. 6 according to the first embodiment.

In the embodiment, as described above, the base station apparatus 200 decides whether to use the nonlinear precoding in regard to each terminal apparatus 400 in a procedure of connection establishment with the terminal apparatus 400 and notifies the terminal apparatus 400 of the nonlinear precoding setting information by using the RRC connection setup message. Each terminal apparatus 400 acquires the nonlinear precoding setting information from the notified RRC connection setup message and performs the demodulation process for the user data destined for the own terminal apparatus based on the acquired nonlinear precoding setting information. Thus, the terminal apparatus 400 can appropriately determine whether the MU-MIMO signal transmitted from the base station apparatus 200 is linear-precoded or nonlinear-precoded and can receive and demodulate the signal. Further, the base station apparatus 200 can also notify each terminal apparatus 400 of a different piece of nonlinear precoding setting information.

Third Embodiment

A schematic configuration example of a wireless communication system according to the present embodiment is illustrated in FIG. 1 as in the first embodiment. The configuration of a base station apparatus 200 is the same as that of FIG. 2 and the configuration of a terminal apparatus 400 is the same as that of FIG. 4. A process corresponding to control information is different. Hereinafter, different points between the wireless communication systems according to the embodiment and the first embodiment will be described. The description of the same point will be omitted.

Figure 8:
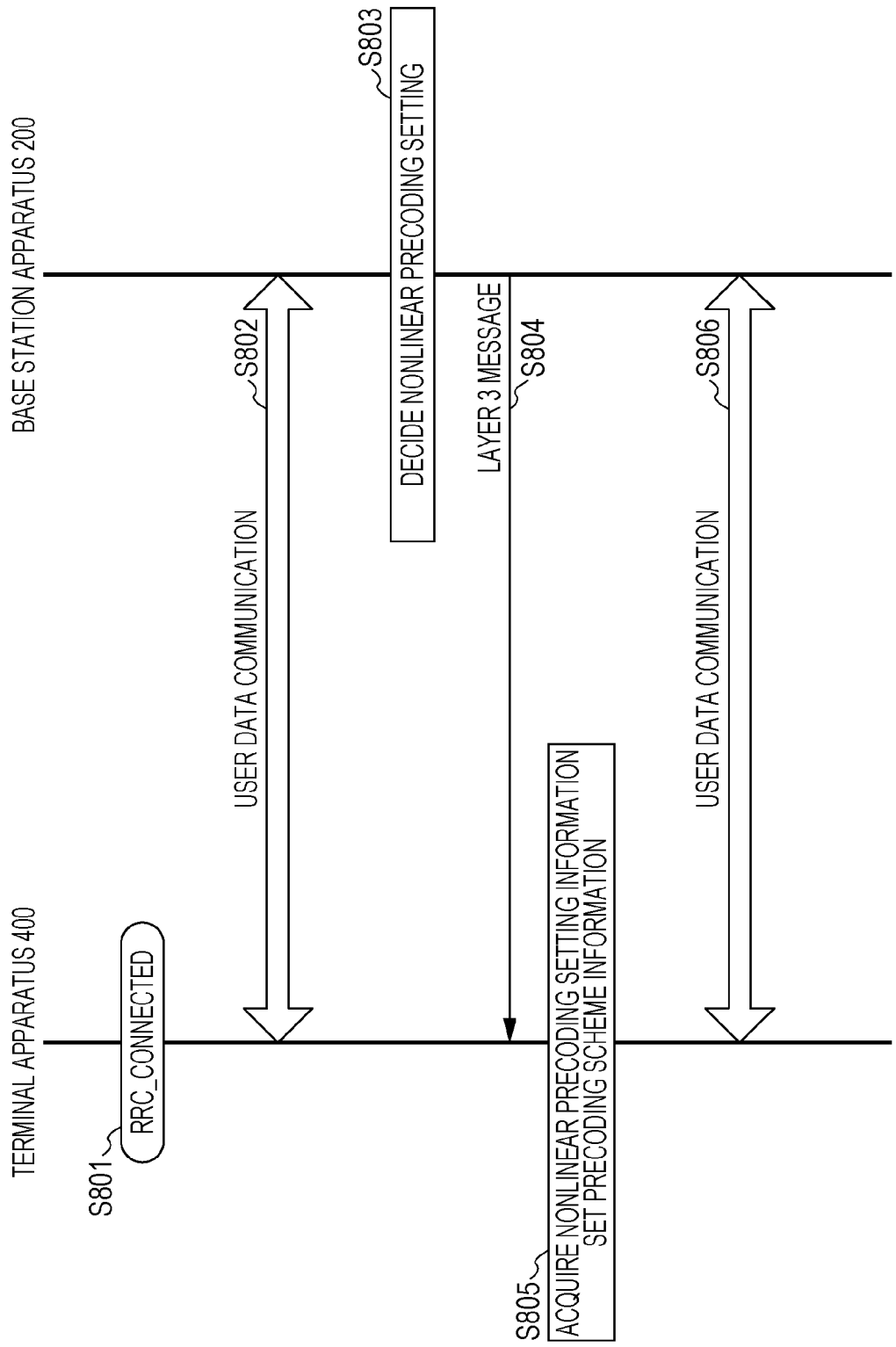
FIG. 8 is a sequence chart illustrating a communication example between the base station apparatus 200 and the terminal apparatus 400 according to a third embodiment of the present invention.

FIG. 8 is a sequence chart illustrating a communication example between the base station apparatus 200 and the terminal apparatus 400 according to the present embodiment.

In FIG. 8, the terminal apparatus 400 is assumed to be already in a connection state (RRC_CONNECTED state) with the base station apparatus 200 (step S801) and communicate the user data with the base station apparatus 200 (step S802). At this time, the connection may be established based on the flowchart of FIG. 5 according to the first embodiment or the flowchart of FIG. 7 according to the second embodiment, and the terminal apparatus 400 may acquire the nonlinear precoding setting information broadcasted with the system information or the nonlinear precoding setting information notified of with the RRC connection setup message to set the precoding scheme information (as an initial state), and may perform the demodulation process based on the precoding scheme information. When the nonlinear precoding setting information is not acquired, the demodulation process considering no modulo calculation is preferably performed.

The base station apparatus 200 decides or re-decides the nonlinear precoding setting of whether to use the nonlinear precoding as the precoding scheme for the terminal apparatus 400 based on a traffic state in the own cell, a channel state with the terminal apparatus 400, or the like (step S803) and transmits the decided nonlinear precoding setting information as the layer 3 message to the terminal apparatus 400 by using the physical downlink shared channel (step S804).

When the terminal apparatus 400 receives the nonlinear precoding setting information as the layer 3 message from the base station apparatus 200, the terminal apparatus 400 sets or resets the precoding scheme information (step S805).

Thereafter, user data communication between the base station apparatus 200 and the terminal apparatus 400 is performed again (step S806). The terminal apparatus 400 performs a demodulation process based on the precoding scheme information set in step S805 at the time of reception of the downlink user data (reception of the physical downlink shared channel).

A flow example of the demodulation process in the terminal apparatus 400 according to the embodiment is the same as that of FIG. 6 according to the first embodiment.

In the embodiment, as described above, the base station apparatus 200 decides whether to use the nonlinear precoding in regard to each terminal apparatus 400 in the connection state and notifies the terminal apparatus 400 of the nonlinear precoding setting information by using the layer 3 message. Each terminal apparatus 400 acquires the nonlinear precoding setting information from the notified layer 3 message and performs the demodulation process for the user data destined for the own terminal apparatus based on the acquired nonlinear precoding setting information. Thus, the terminal apparatus 400 can appropriately determine whether the MU-MIMO signal transmitted from the base station apparatus 200 is linear-precoded or nonlinear-precoded and can receive and demodulate the signal. Further, the base station apparatus 200 changes the nonlinear precoding setting according to a traffic state of the own cell, a channel state of each terminal apparatus 400, or the like and can also notify each terminal apparatus 400 of a different piece of nonlinear precoding setting information.

Fourth Embodiment

A schematic configuration example of a wireless communication system according to the present embodiment is illustrated in FIG. 1 as in the first embodiment. The configuration of a base station apparatus 200 is the same as that of FIG. 2 and the configuration of a terminal apparatus 400 is the same as that of FIG. 4. A process corresponding to control information is different. Hereinafter, different points between the wireless communication systems according to the embodiment and the first embodiment will be described. The description of the same point will be omitted.

FIG. 9 is a sequence chart illustrating a communication example between the base station apparatus 200 and the terminal apparatus 400 according to the present embodiment.

In FIG. 9, the terminal apparatus 400 is assumed to be already in a connection state (RRC_CONNECTED state) with the base station apparatus 200 (step S901) and communicate the user data with the base station apparatus 200 (step S902). At this time, the connection may be established based on the flowchart of FIG. 5 according to the first embodiment or the flowchart of FIG. 7 according to the second embodiment, and the terminal apparatus 400 may acquire the nonlinear precoding setting information broadcasted with the system information or the nonlinear precoding setting information notified of with the RRC connection setup message to set the precoding scheme information (as an initial state), and may perform the demodulation process based on the precoding scheme information. When the nonlinear precoding setting information is not acquired, the demodulation process considering no modulo calculation is preferably performed.

The base station apparatus 200 re-decides the nonlinear precoding setting of whether to use the nonlinear precoding as the precoding scheme for the terminal apparatus 400 based on a traffic state in the own cell, a channel state with the terminal apparatus 400, or the like (step S903), and includes the decided nonlinear precoding setting information in an RRC connection reconfiguration message which is a connection reconfiguration message reconfiguring the setting of the network connection state and transmits the RRC connection reconfiguration message to the terminal apparatus 400 (step S904).

When the terminal apparatus 400 receives the RRC connection reconfiguration message from the base station apparatus 200, the terminal apparatus 400 acquires the nonlinear precoding setting information included in the RRC connection reconfiguration message and resets the precoding scheme information (step S905).

The terminal apparatus 400 transmits an RRC connection reconfiguration complete message indicating that the reconfiguration of the connection state is complete by using the physical uplink shared channel (step S906).

Thereafter, user data communication between the base station apparatus 200 and the terminal apparatus 400 is performed again (step S907). The terminal apparatus 400 performs a demodulation process based on the precoding scheme information set in step S905 at the time of reception of the downlink user data (reception of the physical downlink shared channel).

A flow example of the demodulation process in the terminal apparatus 400 according to the embodiment is the same as that of FIG. 6 according to the first embodiment.

In the embodiment, as described above, the base station apparatus 200 decides whether to use the nonlinear precoding in regard to each terminal apparatus 400 in the connection state and notifies the terminal apparatus 400 of the nonlinear precoding setting information by using the RRC connection reconfiguration message reconfiguring the network connection state. Each terminal apparatus 400 acquires the nonlinear precoding setting information from the notified RRC connection reconfiguration message and performs the demodulation process for the user data destined for the own terminal apparatus based on the acquired nonlinear precoding setting information. Thus, the terminal apparatus 400 can appropriately determine whether the MU-MIMO signal transmitted from the base station apparatus 200 is the linear-precoded or the nonlinear-precoded and can receive and demodulate the signal. Further, the base station apparatus 200 changes the nonlinear precoding setting according to a traffic state of the own cell, a channel state of each terminal apparatus 400, or the like and can also notify each terminal apparatus 400 of a different piece of nonlinear precoding setting information.

In each of the foregoing embodiments, the case has been exemplified in which the base station apparatus 200 invariably performs the nonlinear precoding in the MU-MIMO transmission when the nonlinear precoding setting is set to ON, and the terminal apparatus 400 invariably performs the demodulation process considering the modulo calculation when the precoding scheme information set based on the acquired nonlinear precoding setting information indicates the nonlinear precoding.

However, embodiments of the present invention are not limited thereto. For example, when the nonlinear precoding setting is ON, the base station apparatus 200 may be able to select the nonlinear precoding in addition to the linear precoding in the MU-MIMO transmission.

At this time, the terminal apparatus 400 may perform the demodulation process considering no modulo calculation by using the received signal as a signal by the linear precoding when the precoding scheme information set based on the acquired nonlinear precoding setting information indicates the linear precoding. When the precoding scheme information indicates the nonlinear precoding, the terminal apparatus 400 may blindly estimates whether the received signal is a signal by the linear precoding or a signal by the nonlinear precoding and may perform a process of selecting the demodulation process considering no modulo calculation or the demodulation process considering the modulo calculation.

As a method of blindly estimating whether the received signal is the signal by the linear precoding or the signal by the nonlinear precoding, there is a method of estimating that the precoding corresponding to a demodulation processing method in which a likelihood is high or a bit error is small is performed as each demodulation result obtained by performing the demodulation process considering no modulo calculation and the demodulation process considering modulo calculation on the received signal or a result obtained by further performing error correction decoding on the received signal. As another blind estimation method, there is a method of measuring power of the subcarrier of the received signal, estimating that the received signal is a signal by the nonlinear precoding when the power measurement result is greater than a preset threshold value, and estimating that the received signal is a signal by the linear precoding when the power measurement result is equal to or less than the preset threshold value. As further another blind estimation method, there is a method of measuring power dispersion or the amplitude of the signal point of the subcarrier of the received signal, estimating that the received signal is a signal by the nonlinear precoding when a dispersion measurement result is greater than a preset threshold value, and estimating that the received signal is a signal by the linear precoding when the dispersion measurement result is equal to or less than the preset threshold value. The method of blindly estimating that the received signal is a signal by the linear precoding or a signal by the nonlinear precoding is not limited to the foregoing methods.

In each of the foregoing embodiments, the base station apparatus 200 switches a table of a Modulation and Coding Scheme (MCS) by a combination of coding rates and modulation schemes in the physical downlink shared channel according to the nonlinear precoding setting. That is, the base station apparatus 200 may prepare different MCS tables for the linear precoding and the nonlinear precoding.

(1) The present invention can also be expressed as follows. According an aspect of the present invention, a base station apparatus includes nonlinear precoding setting information regarding whether to use nonlinear precoding in multiuser MIMO transmission in system information and notifies a terminal apparatus of the nonlinear precoding setting information.

(2) According to an aspect of the present invention, a base station apparatus includes nonlinear precoding setting information regarding whether to use nonlinear precoding in multiuser MIMO transmission in a connection setting message in a procedure to establish connection of the radio resource control layer with a terminal apparatus and notifies the terminal apparatus of the nonlinear precoding setting information.

(3) According to an aspect of the present invention, a base station apparatus notifies a terminal apparatus of nonlinear precoding setting information regarding whether to use nonlinear precoding in multiuser MIMO transmission as a message of a radio resource control layer.

(4) According to an aspect of the present invention, a base station apparatus includes nonlinear precoding setting information regarding whether to use the nonlinear precoding in the multiuser MIMO transmission in a connection reconfiguration message in a procedure to reconfigure connection of the radio resource control layer with a terminal apparatus and notifies the terminal apparatus of the nonlinear precoding setting information.

(5) According to an aspect of the present invention, a terminal apparatus acquires nonlinear precoding setting information which is included in system information and notified by a base station apparatus and is information regarding whether to use nonlinear precoding and performs a demodulation process considering modulo calculation on a received signal when the nonlinear precoding setting information indicates that the nonlinear precoding is used.

(6) According to an aspect of the present invention, a terminal apparatus acquires nonlinear precoding setting information which is included in a connection setting message in a procedure to establish connection of a radio resource control layer with a base station apparatus and notified by the base station apparatus and is information regarding whether to use nonlinear precoding, and performs a demodulation process considering modulo calculation on a received signal when the nonlinear precoding setting information indicates that the nonlinear precoding is used.

(7) According to an aspect of the present invention, a terminal apparatus acquires nonlinear precoding setting information which is notified of as a message of a radio resource control layer by a base station apparatus and is information regarding whether to use nonlinear precoding, and performs a demodulation process considering modulo calculation on a received signal when the nonlinear precoding setting information indicates that the nonlinear precoding is used.

(8) According to an aspect of the present invention, a terminal apparatus acquires nonlinear precoding setting information which is included in a connection reconfiguration message in a procedure to reconfigure connection of a radio resource control layer with a base station apparatus and notified by the base station apparatus and is information regarding whether to use nonlinear precoding, and performs a demodulation process considering modulo calculation on a received signal when the nonlinear precoding setting information indicates that the nonlinear precoding is used.

(9) According to an aspect of the present invention, a terminal apparatus decides control information of which a base station apparatus is notified and is information regarding a channel state between the base station apparatus and the own terminal apparatus based on the nonlinear precoding setting information.

(10) In a wireless communication system according to an aspect of the present invention, a base station apparatus includes nonlinear precoding setting information regarding whether to use nonlinear precoding in multiuser MIMO transmission in system information and notifies a plurality of terminal apparatuses of the nonlinear precoding setting information. The terminal apparatus receives system information notified by the base station apparatus, acquires the nonlinear precoding setting information, and performs a demodulation process considering modulo calculation on a received signal when the acquired nonlinear precoding setting information indicates that nonlinear precoding is used.

(11) In a wireless communication system according to an aspect of the present invention, a base station apparatus includes nonlinear precoding setting information regarding whether to use the nonlinear precoding in the multiuser MIMO transmission in a connection setting message in a procedure to establish connection of a radio resource control layer with a terminal apparatus and notifies the terminal apparatus of the nonlinear precoding setting information. The terminal apparatus acquires the nonlinear precoding setting information which is included in the connection setting message in the procedure to establish the connection of the radio resource control layer and notified by the base station apparatus and is information regarding whether to use nonlinear precoding and performs a demodulation process considering modulo calculation on a received signal when the acquired nonlinear precoding setting information indicates that the nonlinear precoding is used.

(12) In a wireless communication system according to an aspect of the present invention, a base station apparatus notifies a terminal apparatus of nonlinear precoding setting information of whether nonlinear precoding is used in multiuser MIMO transmission as a message of a radio resource control layer. The terminal apparatus acquires the nonlinear precoding setting information notified of as the message of the radio resource control layer by the base station apparatus and performs a demodulation process considering modulo calculation on a received signal when the acquired nonlinear precoding setting information indicates that the nonlinear precoding is used.

(13) In a wireless communication system according to an aspect of the present invention, a base station apparatus includes nonlinear precoding setting information regarding whether to use the nonlinear precoding in the multiuser MIMO transmission in a connection reconfiguration message in a procedure to reconfigure connection of a radio resource control layer with a terminal apparatus and notifies the terminal apparatus of the nonlinear precoding setting information. The terminal apparatus acquires the nonlinear precoding setting information which is included in the connection setting message in the procedure to reconfigure connection of the radio resource control layer and notified by the base station apparatus and performs a demodulation process considering modulo calculation on a received signal when the acquired nonlinear precoding setting information indicates that the nonlinear precoding is used.

(14) According to an aspect of the present invention, an integrated circuit is mounted on a base station apparatus and causes the base station apparatus to have a plurality of functions. The integrated circuit causes the base station apparatus to have a series of functions including: a function of generating nonlinear precoding setting information regarding whether to use nonlinear precoding in multiuser MIMO transmission; and a function of notifying a terminal apparatus of the nonlinear precoding setting information as a message of a radio resource control layer.

(15) According to an aspect of the present invention, an integrated circuit is mounted on a terminal apparatus and causes the terminal apparatus to have a plurality of functions. The integrated circuit causes the terminal apparatus to have a series of functions including: a function of acquiring nonlinear precoding setting information which is notified of as a message of a radio resource control layer by a base station apparatus and is information regarding whether to use nonlinear precoding; and a function of performing a demodulation process considering modulo calculation on a received signal when the nonlinear precoding setting information indicates that nonlinear precoding is used.

The embodiments of the present invention have been described above in detail with reference to the drawings, but specific configurations are not limited to the embodiments. Designs and the like within the scope of the present invention without departing from the gist of the present invention are also included in the claims.

The present invention is not limited to the above-described embodiments. Regardless to say, the terminal apparatus 400 according to the present invention is not limited to application to a terminal apparatus of a cellular system, a wireless LAN system, or the like, but can be applied to electronic apparatuses, for example, AV apparatus, kitchen apparatuses, cleaning and washing apparatuses, air conditioning apparatuses, office apparatuses, automatic vending machines, and other life appliances.

A program operating as the base station apparatus 200 and the terminal apparatus 400 according to the present invention is a program (which is a program functioning a computer) controlling a CPU or the like so that functions of the above-described embodiment of the present invention are realized. Information handled by the apparatuses is accumulated temporarily in a RAM at the time of processing, is subsequently in various ROMs or HDDs, is read by a CPU, as necessary, and is corrected and written. A recording medium storing the program may be any one of a semiconductor medium (for example, a ROM or a nonvolatile memory card), an optical recording medium (for example, a DVD, an MO, an MD, a CD, or a BD), and a magnetic recording medium (for example, a magnetic tape or a flexible disk). Not only the functions according to the above-described embodiment are realized by executing the loaded program, but also the functions according to the present invention are realized by processing the program in cooperation with an operating system, another application program, or the like.

When the program is circulated in a market, the program can be stored in a portable recording medium to be circulated or can be transmitted to a server computer connected via a network such the Internet. In this case, a storage device of the server computer is also included in the present invention. Parts or all of the base station apparatus 200 and the terminal apparatus 400 according to the above-described embodiments may be realized as an LSI which is typically an integrated circuit. Functional blocks of the base station apparatus 200 and the terminal apparatus 400 may be individually realized as processors, or some or all of the functional blocks may be integrated to be realized as processors. The integrated circuit method is not limited to an LSI, but may be realized as a dedicated circuit or a general processor. When integrated circuit technologies substituting the LSI appear with advance in semiconductor technologies, integrated circuits realized by these technologies can also be used.

The present invention is suitable for a base station apparatus, a terminal apparatus, and a wireless communication system.

| Reference Signs List | |
|---|---|
| 200 | base station apparatus |
| 201 | coding unit |
| 202 | scramble unit |
| 203 | modulation unit |
| 204 | layer mapping unit |
| 205 | precoding unit |
| 206 | resource element mapping unit |
| 207 | OFDM signal generation unit |
| 208 | transmission antenna unit |
| 209 | reference signal generation unit |
| 210 | control information generation unit |
| 211 | control unit |
| 212 | higher layer unit |
| 213 | media access control unit |
| 214 | radio link control unit |
| 215 | radio resource control unit |
| 216 | physical layer unit |
| 301 | linear precoding unit |
| 302 | nonlinear precoding unit |
| 303 | selection unit |
| 400, 400-1 to 400-4 | terminal apparatus |
| 401 | reception antenna unit |
| 402 | OFDM signal demodulation unit |
| 403 | resource element demapping unit |
| 404 | reception filter unit |
| 405 | layer demapping unit |
| 406 | demodulation unit |
| 407 | descramble unit |
| 408 | decoding unit |
| 409 | control information acquisition unit |
| 410 | channel estimation unit |
| 411 | control unit |
| 412 | higher layer unit |
| 413 | media access control unit |
| 414 | radio link control unit |
| 415 | radio resource control unit |
| 416 | physical layer unit |

The invention claimed is:

1. A base station apparatus which multiplexes spatially a plurality of data destined for a plurality of terminal apparatuses by using multiuser MIMO transmission and transmits the spatially multiplexed data, the base station apparatus comprising:
   circuitry; and
   memory associated with the circuitry; wherein
   the circuitry:
      determines whether nonlinear precoding can be selected in the multiuser MIMO transmission;
      generates a message of a radio resource control layer including nonlinear precoding setting information indicating whether nonlinear precoding can be selected in the multiuser MIMO transmission; and
      performs a precoding process on a plurality of modulation symbol sequences that each respectively corresponds to each of the plurality of data;
   a transmission antenna that transmits the message of the radio resource control layer to a terminal apparatus;
   in a case when the nonlinear precoding setting information indicates that nonlinear precoding can be selected, the circuitry selects one of a linear precoding process and a nonlinear precoding process and performs the selected precoding process on the plurality of modulation symbol sequences, the selected precoding process being able to be demodulated by the terminal using one of a demodulation process considering no modulo calculation or a demodulation process considering modulo calculation based on the message of the radio resource control layer, and
   in a case when the nonlinear precoding setting information indicates that nonlinear precoding cannot be selected, the circuitry performs the linear precoding process on the plurality of modulation symbol sequences.

2. The base station apparatus according to claim 1, wherein the message of the radio resource control layer is system information.

3. The base station apparatus according to claim 1, wherein the message of the radio resource control layer is a connection setting message in a procedure to establish connection of the radio resource control layer with the terminal apparatus.

4. The base station apparatus according to claim 1, wherein the message of the radio resource control layer is a connection reconfiguration message in a procedure to reconfigure connection of the radio resource control layer with the terminal apparatus.

5. A terminal apparatus communicating with a base station apparatus including a plurality of antennas, comprising:
   circuitry; and
   memory associated with the circuitry; wherein
   the circuitry acquires a message of a radio resource control layer notified by the base station apparatus;
   the circuitry acquires nonlinear precoding setting information indicating whether nonlinear precoding can be selected from the message of the radio resource control layer;
   the circuitry demodulates a received signal transmitted by the base station using multiuser MIMO transmission, wherein
   in a case when the nonlinear precoding setting information indicates that nonlinear precoding can be selected, the circuitry estimates whether the received signal is a signal by linear precoding or a signal by the nonlinear precoding based on the received signal, selects respectively a demodulation process considering no modulo calculation or a demodulation process considering modulo calculation based on the estimation result, and performs the selected demodulation process on the received signal; and
   in a case when the nonlinear precoding setting information indicates that nonlinear precoding cannot be selected, the demodulator performs the demodulation process considering no modulo calculation.

6. The terminal apparatus according to claim 5, wherein the message of the radio resource control layer is system information.

7. The terminal apparatus according to claim 5, wherein the message of the radio resource control layer is a connection setting message in a procedure to establish connection of the radio resource control layer with the base station apparatus.

8. The terminal apparatus according to claim 5, wherein the message of the radio resource control layer is a connection reconfiguration message in a procedure to reconfigure the connection of the radio resource control layer with the base station apparatus.

9. The terminal apparatus according to claim 5, wherein control information which is information of which the base station apparatus is notified and is information regarding a channel state between the base station apparatus and the own terminal apparatus is decided based on the nonlinear precoding setting information.

* * * * *